(12) United States Patent
Ou et al.

(10) Patent No.: US 12,360,216 B2
(45) Date of Patent: Jul. 15, 2025

(54) LASER RADAR

(71) Applicant: SHENZHEN YINWANG INTELLIGENT TECHNOLOGIES CO., LTD., Shenzhen (CN)

(72) Inventors: Yangkui Ou, Wuhan (CN); Li Zeng, Shenzhen (CN); Guoqing Han, Shenzhen (CN); Chendi Jiang, Wuhan (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 1067 days.

(21) Appl. No.: 17/346,485

(22) Filed: Jun. 14, 2021

(65) Prior Publication Data

US 2021/0302546 A1 Sep. 30, 2021

Related U.S. Application Data

(63) Continuation of application No. PCT/CN2019/124774, filed on Dec. 12, 2019.

(30) Foreign Application Priority Data

Dec. 12, 2018 (CN) .......................... 201811518636.X

(51) Int. Cl.
*G01S 7/481* (2006.01)
*G01S 17/06* (2006.01)
(Continued)

(52) U.S. Cl.
CPC ............ *G01S 7/4817* (2013.01); *G01S 17/06* (2013.01); *G01S 17/88* (2013.01); *G02B 26/105* (2013.01)

(58) Field of Classification Search
CPC ........ G01S 7/4817; G01S 17/06; G01S 17/88; G01S 17/02; G02B 26/105
(Continued)

(56) References Cited

U.S. PATENT DOCUMENTS 9,874,635 B1 1/2018 Eichenholz et al.
2016/0274222 A1 9/2016 Yeun
(Continued)

FOREIGN PATENT DOCUMENTS

CN 103278809 A 9/2013
CN 103744071 A 4/2014
(Continued)

OTHER PUBLICATIONS

Chongfei, L., et al., "Structure Design and Analysis of a Double-sided Fast Steering Mirror," Mechanical Science and Technology for Aerospace Engineering, 2016, Issue 08, 18 pages.
(Continued)

*Primary Examiner* — Daniel L Murphy
(74) *Attorney, Agent, or Firm* — Conley Rose, P.C.

(57) ABSTRACT

A laser radar includes a light source, a scanning mirror, a detector, and a reflector group. The scanning mirror includes an emitting reflective surface and a receiving reflective surface. The reflector group includes a first reflector and a second reflector. An included angle between the first reflector and the second reflector is a first included angle, an included angle between an incident laser beam of the emitting reflective surface and an emergent laser beam of the receiving reflective surface is a second included angle, and the second included angle is twice the first included angle. The emitting reflective surface is configured to reflect the laser beam emitted by the light source. The receiving reflective surface is configured to reflect, to the detector, the laser beam reflected back by an object. The reflect group is
(Continued)

configured to change a propagation direction of the laser beam.

21 Claims, 17 Drawing Sheets

(51) Int. Cl.
*G01S 17/88* (2006.01)
*G02B 26/10* (2006.01)

(58) Field of Classification Search
USPC ..................................................... 356/4.01
See application file for complete search history.

(56) References Cited

U.S. PATENT DOCUMENTS

| | | |
|---|---|---|
| 2017/0371029 A1 | 12/2017 | Axelsson |
| 2018/0231640 A1 | 8/2018 | Han et al. |
| 2018/0267147 A1 | 9/2018 | Choi et al. |

FOREIGN PATENT DOCUMENTS

| | | |
|---|---|---|
| CN | 107153200 A | 9/2017 |
| CN | 107390200 A | 11/2017 |
| CN | 206920600 U | 1/2018 |
| CN | 207135105 U | 3/2018 |
| CN | 108089174 A | 5/2018 |
| CN | 207457508 U | 6/2018 |
| CN | 108710134 A | 10/2018 |
| CN | 208092233 U | 11/2018 |
| DE | 102016221245 A1 | 5/2018 |
| EP | 3290986 A2 | 3/2018 |
| EP | 3361279 A1 | 8/2018 |
| JP | 2004361315 A | 12/2004 |
| WO | 0152453 A1 | 7/2001 |
| WO | 2016175395 A2 | 11/2016 |

OTHER PUBLICATIONS

Zhou, et al., "Design of Fast Steering Mirror Systems for Precision Laser Beams Steering," ROSE 2008-IEEE International Workshop on Robotic and Sensors Environments Ottawa-Canada, Oct. 17-18, 2008, 6 pages.

Jiang C., et al., "Slope Efficiency Analysis of Optically Pumped Semiconductor VerticalExternal Cavity Surface Emitting Laser," 2010, with an English Abstract, 6 pages.

LASER RADAR

CROSS-REFERENCE TO RELATED APPLICATIONS

This application is a continuation of International Patent Application No. PCT/CN2019/124774, filed on Dec. 12, 2019, which claims priority to Chinese Patent Application No. 201811518636.X, filed on Dec. 12, 2018. The disclosures of the aforementioned applications are hereby incorporated by reference in their entireties.

TECHNICAL FIELD

This application relates to the field of detection technologies, and in particular, to a laser radar.

BACKGROUND

A laser detection and ranging (ladar), which is referred to as a laser radar herein, is a radar system that detects feature parameters such as a position and a speed of a target by emitting a laser beam. A working principle of the laser radar is to emit a laser beam to a target, compare the emitted laser beam with the received laser beam reflected from the target, and then perform appropriate processing to obtain related information of the target, such as a distance, an orientation, a height, a speed, a posture, and even a shape and other parameters of the target.

In a related technology, the laser radar includes a light source, a scanning mirror, a detector, and a reflector. The scanning mirror and the reflector each have a reflective surface, and the reflector is provided with a small hole. A laser beam emitted by the light source falls onto the scanning mirror through the small hole in the reflector, and is reflected and output by the scanning mirror. The laser beam diffusely reflected back by the target is reflected by the scanning mirror to the reflector, and then reflected by the reflector to the detector. The detector receives the reflected laser beam. In a working process of the laser radar, a fixed emergent laser beam may be emitted to different directions by rotating the scanning mirror, to scan and emit the laser beam.

The related technology has at least the following problem.

In the related technology, the scanning mirror of the laser radar has only one reflective surface. Both the emitted laser beam and the reflected laser beam need to be reflected on the reflective surface, and the emitted laser beam and the reflected laser beam each occupy a partial area of the reflective surface of the scanning mirror. As a result, an optical path of the emitted laser beam is close to an optical path of the reflected laser beam, and crosstalk is likely generated between the emitted laser beam and the reflected laser beam. This imposes an extremely high requirement on assembling and commissioning precision.

SUMMARY

To resolve a technical problem in a related technology, embodiments of the present disclosure provide a laser radar.

An embodiment of the present disclosure provides a laser radar. The laser radar includes a light source, a scanning mirror, a detector, and a reflector group. The scanning mirror includes an emitting reflective surface and a receiving reflective surface. The reflector group includes at least a first reflector and a second reflector, and the first reflector and the second reflector are perpendicular to a same plane. An included angle between the first reflector and the second reflector is a first included angle, an included angle between an incident laser beam of the emitting reflective surface and an emergent laser beam of the receiving reflective surface is a second included angle, and the second included angle is twice the first included angle. The emitting reflective surface is configured to reflect the incident laser beam emitted by the light source, where the reflected laser beam is used to scan an object. The receiving reflective surface is configured to reflect, to the detector, the laser beam reflected back by the object. The first reflector and the second reflector are configured to change a propagation direction of the laser beam.

An embodiment of the present disclosure provides a laser radar. The laser radar includes a light source, a scanning mirror, a detector, and a reflector group. The scanning mirror includes an emitting reflective surface and a receiving reflective surface, and an included angle between the emitting reflective surface and the receiving reflective surface is a third included angle. The reflector group includes a first reflector and a second reflector, and the first reflector and the second reflector are perpendicular to a same plane. An included angle between the first reflector and the second reflector is a first included angle, and an included angle between an incident laser beam of the emitting reflective surface and an emergent laser beam of the receiving reflective surface is a second included angle. When an included angle between a laser beam incident onto the receiving reflective surface and the receiving reflective surface is greater than an included angle between the laser beam incident onto the receiving reflective surface and the emitting reflective surface, the second included angle is twice a sum of the first included angle and the third included angle. Alternatively, when an included angle between a laser beam incident onto the receiving reflective surface and the receiving reflective surface is less than an included angle between the laser beam incident onto the receiving reflective surface and the emitting reflective surface, the second included angle is twice a difference between the first included angle and the third included angle. The emitting reflective surface is configured to reflect the incident laser beam emitted by the light source, where the reflected laser beam is used to scan an object. The receiving reflective surface is configured to reflect, to the detector, the laser beam reflected back by the object. The first reflector and the second reflector are configured to change a propagation direction of the laser beam.

Figure 1:
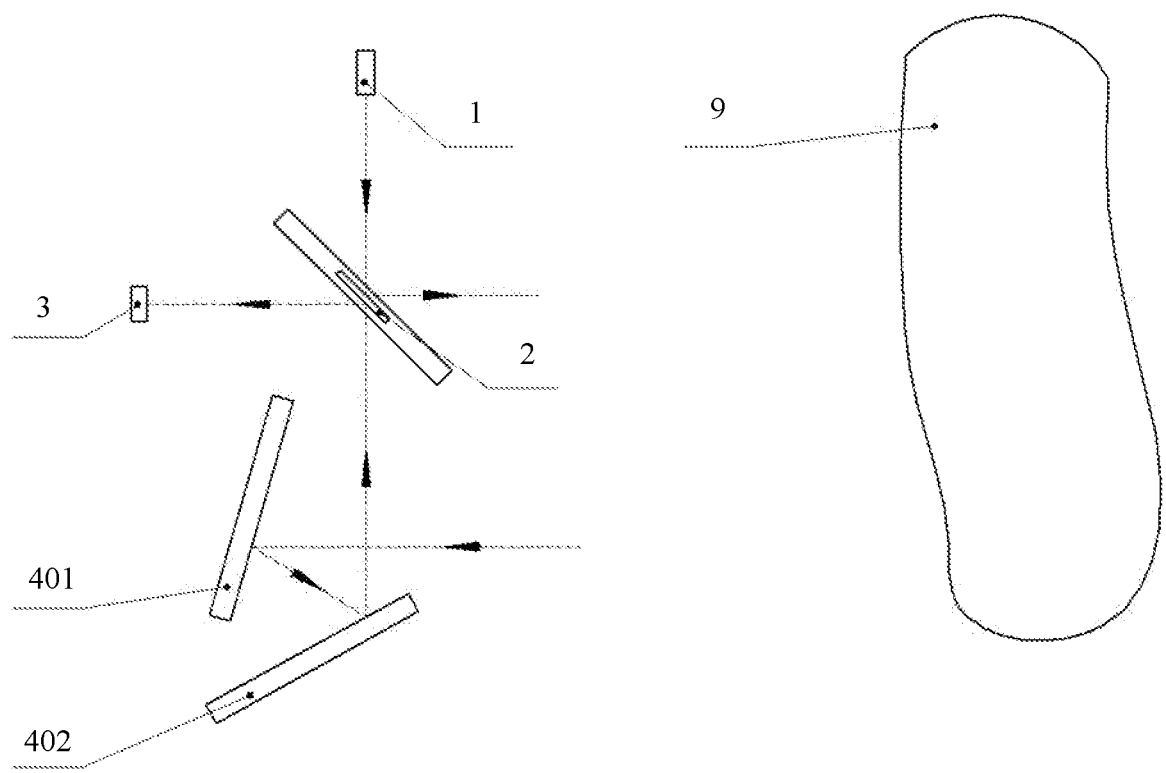
FIG. 1 is a schematic structural diagram of a laser radar according to an embodiment.

Reference signs are below.

1: light source; 2: scanning mirror; 3: detector; 401: first reflector; 402: second reflector; 403: third reflector; 404: fourth reflector; 405: fifth reflector; 406: sixth reflector; 407: seventh reflector; 408: eighth reflector; 5: first lens; 6: second lens; 7: third lens; 8: fourth lens; 9: object.

DESCRIPTION OF EMBODIMENTS

The embodiments of the present disclosure provide a laser radar. As an auxiliary component of an intelligent driving system, the laser radar can be applied to a vehicle to detect a surrounding vehicle, a pedestrian, an obstacle, and the like. The laser radar can also be applied in the military field for battlefield surveillance, electronic countermeasures, tracking and measurement, and the like. The laser radar is applied in the field of environmental science for atmospheric monitoring, wind forecasting, and the like. In addition, the laser radar can also be applied in the fields of bioscience, remote sensing, and the like.

The laser radar may emit a laser beam to a direction using an internal light source. After the laser beam falls onto an object on an optical path, a part of the laser beam is reflected back to the laser radar after diffuse reflection. In this case, the laser radar may detect, using a detector, the laser beam reflected back by the object. Then, the laser radar provides related information of the emitted laser beam and the reflected laser beam to a computer device. The computer device may analyze a status of the object based on the information, to obtain related information of the object, and display the related information of the object, or perform intelligent control based on the related information of the object.

An embodiment of the present disclosure provides a laser radar. As shown in FIG. 1, FIG. 2, FIG. 3, and FIG. 4, the laser radar includes a light source 1, a scanning mirror 2, a detector 3, and a reflector group. The scanning mirror 2 includes an emitting reflective surface and a receiving reflective surface, and the emitting reflective surface and the receiving reflective surface are parallel. The reflector group includes at least a first reflector 401 and a second reflector 402, and the first reflector 401 and the second reflector 402 are perpendicular to a same plane. An included angle between the first reflector 401 and the second reflector 402 is a first included angle, an included angle between an incident laser beam of the emitting reflective surface and an emergent laser beam of the receiving reflective surface is a second included angle, and the second included angle is twice the first included angle. The emitting reflective surface is configured to reflect the laser beam emitted by the light source 1. The receiving reflective surface is configured to reflect, to the detector 3, the laser beam reflected back by an object. The first reflector 401 and the second reflector 402 are configured to change a propagation direction of the laser beam.

The light source 1 is configured to emit the laser beam, and may be a 905 nanometer (nm) semiconductor laser, a 1550 nm fiber laser, or a laser of another wavelength.

The scanning mirror 2 may be a micro-electro-mechanical system (MEMS) scanning mirror. The micro-electro-mechanical system scanning mirror is disposed on a micro-electro-mechanical system chip, and is provided with a reflective lens. Both front and rear surfaces of the reflective lens are plated with a high-reflectivity film layer, and can scan and emit or receive the laser beam. Based on a driving mode, the micro-electro-mechanical system chip may be driven electrostatically, electromagnetically, piezoelectrically, thermoelectrically, or the like. The scanning mirror on the micro-electro-mechanical system chip may also be replaced by a rotatable reflector, for example, a reflective lens placed on a one-dimensional or two-dimensional rotation platform. Both front and rear surfaces of the reflective lens are plated with a high-reflectivity film layer.

The detector 3 may be an avalanche photodiode (APD), a PIN photodiode (PD), a single-photon avalanche photodiode (SPAD), or a multi-pixel photon counter (MPPC). A specific type of the detector 3 is selected based on a detection sensitivity, a detection distance, a response speed, and the like.

The reflector group includes the first reflector and the second reflector. The first reflector and the second reflector may be reflectors with a wide incident angle range. This can improve a reflectivity and reduce an optical path loss. The first reflector and the second reflector may be made into an integral element. For example, two reflective surfaces are plated on a polygonal prism to serve as the first reflector and the second reflector respectively. Alternatively, the first reflector and the second reflector may be made into two separate elements.

In actual application, specific positions of the first reflector and the second reflector may be set as required. The following provides three example positions to describe the present disclosure.

Figure 2:
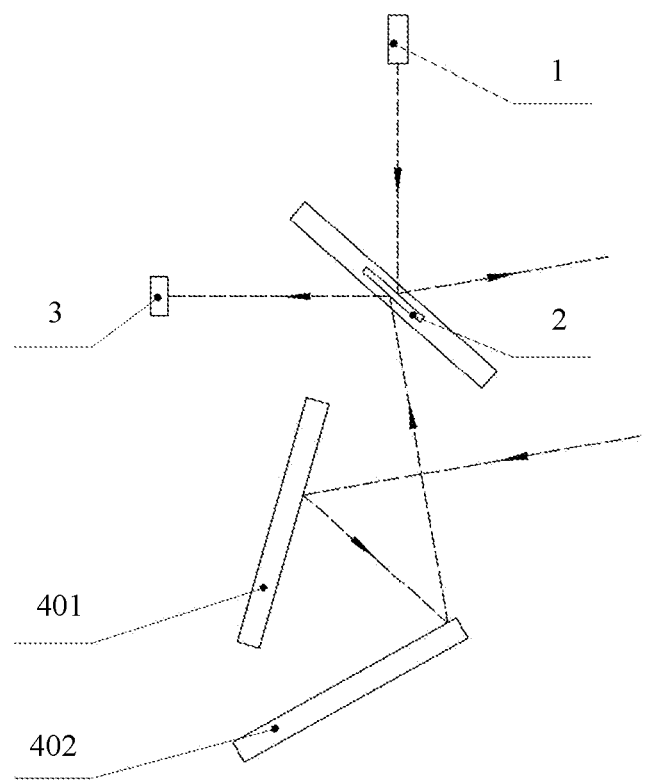
FIG. 2 is a schematic structural diagram of a laser radar according to an embodiment.

In a solution provided in this embodiment of the present disclosure, as shown in FIG. 1 and FIG. 2, the first reflector 401 is configured to reflect, to the second reflector 402, the laser beam reflected back by the object. The second reflector 402 is configured to reflect, to the receiving reflective surface, the laser beam reflected by the first reflector 401.

As shown in FIG. 1 and FIG. 2, the reflector group includes the first reflector 401 and the second reflector 402 at a receiving end. The laser beam emitted by the light source 1 is emitted by the emitting reflective surface of the scanning mirror 2. The laser beam reflected back by the object is reflected by the first reflector 401 to the second reflector 402, reflected by the second reflector 402 to the receiving reflective surface of the scanning mirror 2, and then reflected by the receiving reflective surface of the scanning mirror 2 to the detector 3.

In actual application, the reflector group may further include a third reflector and a fourth reflector. An included angle between the third reflector and the fourth reflector is equal to the included angle between the first reflector and the second reflector. The first reflector, the second reflector, the third reflector, and the fourth reflector are perpendicular to the same plane. The third reflector is configured to reflect, to the fourth reflector, the laser beam reflected back by the object. The fourth reflector is configured to reflect, to the receiving reflective surface, the laser beam reflected by the third reflector. A receiving field of view of the laser radar can be increased by adding the third reflector and the fourth reflector to the reflector group.

Figure 3:
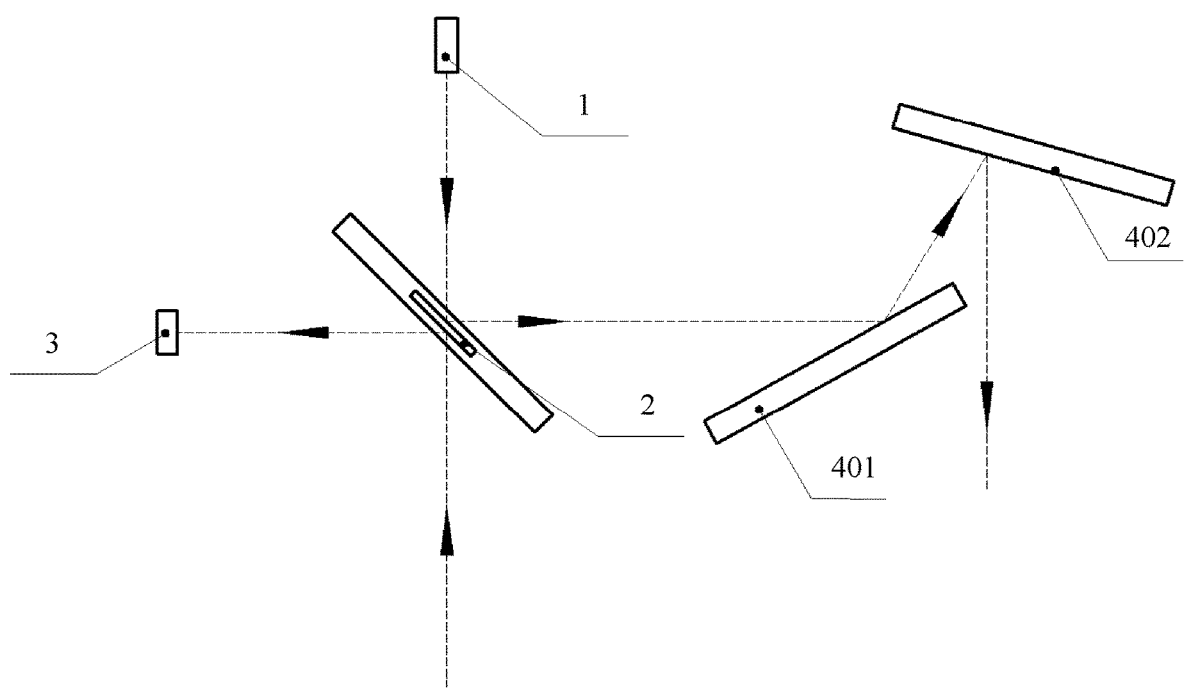
FIG. 3 is a schematic structural diagram of a laser radar according to an embodiment.

In a solution provided in this embodiment of the present disclosure, as shown in FIG. 3, the first reflector 401 is configured to reflect, to the second reflector 402, the laser beam reflected by the emitting reflective surface. The second reflector 402 is configured to reflect the laser beam reflected by the first reflector, to emit the reflected laser beam.

As shown in FIG. 3, the reflector group includes the first reflector 401 and the second reflector 402 at an emitting end. The laser beam emitted by the light source 1 is reflected by the emitting reflective surface of the scanning mirror 2 to the first reflector 401, reflected by the first reflector 401 to the second reflector 402, and then emitted by the second reflector 402. The laser beam reflected back by the object is reflected by the receiving reflective surface of the scanning mirror 2 to the detector 3.

Figure 4:
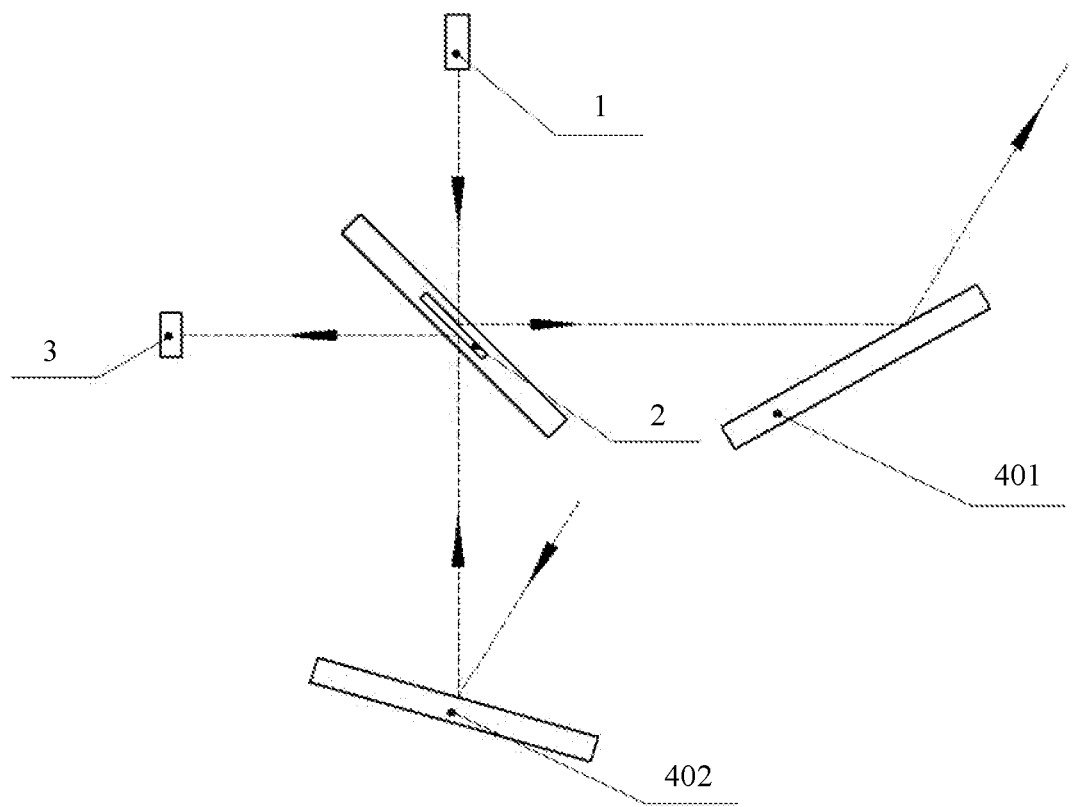
FIG. 4 is a schematic structural diagram of a laser radar according to an embodiment.

In a solution provided in this embodiment of the present disclosure, as shown in FIG. 4, the first reflector 401 is configured to reflect the laser beam reflected by the emitting reflective surface, to emit the reflected laser beam. The second reflector 402 is configured to reflect, to the receiving reflective surface, the laser beam reflected back by the object.

As shown in FIG. 4, the reflector group includes the first reflector 401 at the emitting end, and includes the second reflector 402 at the receiving end. The laser beam emitted by the light source 1 is reflected by the emitting reflective surface of the scanning mirror 2 to the first reflector 401, and then emitted by the first reflector 401. The laser beam reflected back by the object is reflected by the second reflector 402 to the receiving reflective surface of the scanning mirror 2, and then reflected by the receiving reflective surface of the scanning mirror 2 to the detector 3.

In the solutions provided in this embodiment of the present disclosure, as shown in FIG. 1 and FIG. 2, usually it may be approximately considered that the laser beam emitted by the laser radar is parallel to the laser beam reflected back by the object. The included angle between the laser beam incident onto the emitting reflective surface of the scanning mirror 2 and the laser beam reflected by the receiving reflective surface is twice the included angle between the first reflector and the second reflector. Therefore, when the first reflector and the second reflector are fixed, and an angle of the laser beam incident onto the emitting reflective surface of the scanning mirror 2 is unchanged, an angle of the laser beam reflected by the receiving reflective surface also keeps unchanged. In other words, when the scanning mirror 2 rotates in parallel to axes of the first reflector and the second reflector, a direction of the laser beam reflected by the receiving reflective surface does not change with the rotation of the scanning mirror 2. The laser radar provided in this embodiment of the present disclosure implements synchronous scanning and receiving. In other words, provided that an angle of the laser beam emitted by the light source 1 keeps unchanged, an angle of the laser beam received by the detector 3 also keeps unchanged regardless of how the scanning mirror 2 rotates in a one-dimensional direction.

In these solutions, two surfaces of the scanning mirror 2 of the laser radar are reflective surfaces. In other words, the scanning mirror 2 has the receiving reflective surface and the emitting reflective surface. This is different from a technical solution in a related technology. The emitted laser beam and the reflected laser beam are located on two sides of the scanning mirror 2 respectively, to implement complete separation. This avoids crosstalk between the two laser beams, and lowers an assembling and commissioning requirement.

In addition, effective laser beam emitting area and effective laser beam receiving area are increased. This helps achieve a low divergence angle of an emitted beam, increase signal strength of a received beam, and improve the detection distance and detection efficiency.

Only one detector 3 is required to implement synchronous scanning and receiving in the one-dimensional direction, as shown in FIG. 1. However, a one-dimensional detector array is required to implement synchronous scanning and receiving in a two-dimensional direction. For the case in FIG. 1, the one-dimensional detector array is disposed in a direction parallel to the first reflector 401 and the second reflector 402.

In this embodiment of the present disclosure, the scanning mirror 2 may be disposed on an emission path of the light source 1, and there is no other optical device between the scanning mirror 2 and the light source 1. Alternatively, the reflector may be disposed on an emission path of the light source 1, to reflect, to the scanning mirror 2, the laser beam emitted by the light source 1. In addition, the scanning mirror 2 may be disposed on a receiving path of the detector 3, and there is no other optical device between the scanning mirror 2 and the detector 3. Alternatively, the reflector may be disposed on a receiving path of the detector 3, to reflect, to the detector 3, the laser beam reflected by the scanning mirror 2.

When the scanning mirror 2 is disposed on the emission path of the light source 1 and the receiving path of the detector 3, the included angle between the first reflector 401 and the second reflector 402 is the first included angle, and an included angle between an axis of the light source 1 and an axis of the detector 3 is the second included angle. The second included angle is twice the first included angle. In this case, the laser radar does not include an additional reflector. Therefore, the laser radar includes a relatively small quantity of optical elements, and has a relatively simple optical path structure. In this way, a quantity of times that the laser beam is reflected by the reflector is relatively small, and a loss of the laser beam is relatively small.

The axis of the light source 1 is an axis on which the laser beam emitted by the light source 1 is located. The axis of the detector 3 is an axis of a receiving range of the detector 3.

In actual application, considering that the detector 3 has the receiving range, the second included angle may not be strictly twice the first included angle. The second included angle may be obtained by doubling the first included angle and then increasing or decreasing an obtained angle by an angle, in other words, there is a tolerance. For example, if the first included angle is 90°, the second included angle may be 180°+10°.

In a possible implementation, the included angle between the first reflector 401 and the second reflector 402 is 90°.

Figure 5:
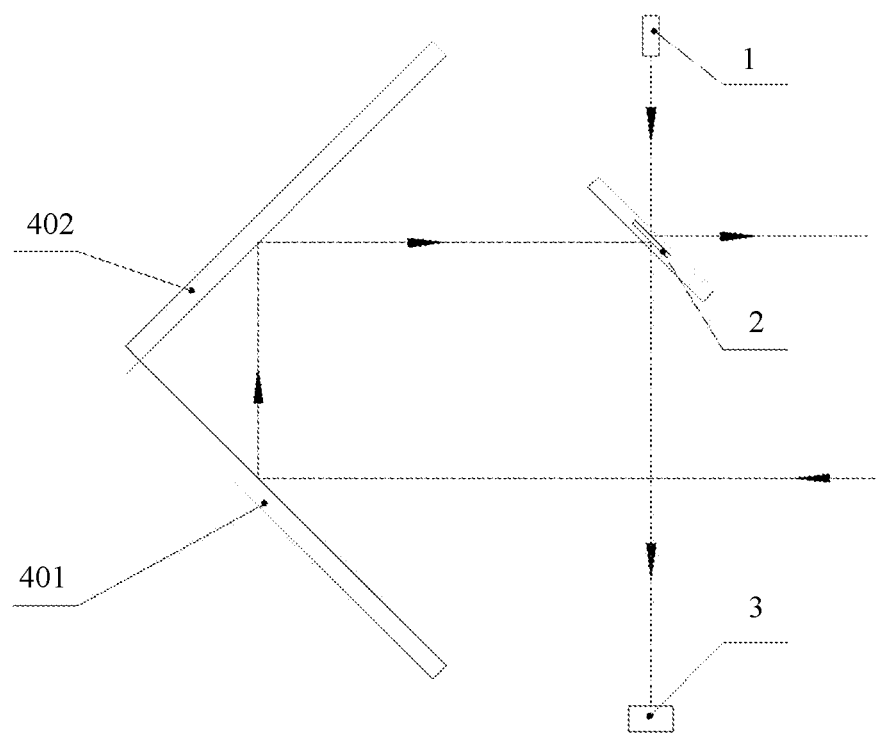
FIG. 5 is a schematic structural diagram of a laser radar according to an embodiment.

In the solutions provided in this embodiment of the present disclosure, as shown in FIG. 5, the included angle formed between the first reflector 401 and the second reflector 402 is 90°, and the included angle between the axis of the light source 1 and the axis of the detector 3 is 180°. When the included angle formed between the first reflector 401 and the second reflector 402 is 90°, the laser radar has a relatively large receiving field of view.

In a possible implementation, the reflector group further includes the third reflector 403 and the fourth reflector 404. The included angle formed between the third reflector 403 and the fourth reflector 404 is equal to the included angle formed between the first reflector 401 and the second reflector 402. The first reflector 401, the second reflector 402, the third reflector 403, and the fourth reflector 404 are perpendicular to the same plane.

The first reflector 401, the second reflector 402, the third reflector 403, and the fourth reflector 404 may be arranged in sequence. Two, three, or four adjacent reflectors may be made into an integrated optical element, or may be made into separated optical elements. For example, the first reflector 401 and the second reflector 402 are made into an integral optical element, and the third reflector 403 and the fourth reflector 404 are also made into an integrated optical element. For another example, the second reflector 402 and the third reflector 403 may be made into an integral optical element, and the first reflector 401 and the fourth reflector 404 are separated from the optical element. For another example, the first reflector 401 and the second reflector 402 are made into an integral optical element, and the third reflector 403 and the fourth reflector 404 are made into two separate optical elements. For another example, the first reflector 401, the second reflector 402, the third reflector 403, and the fourth reflector 404 are made into four separate optical elements.

Figure 6:
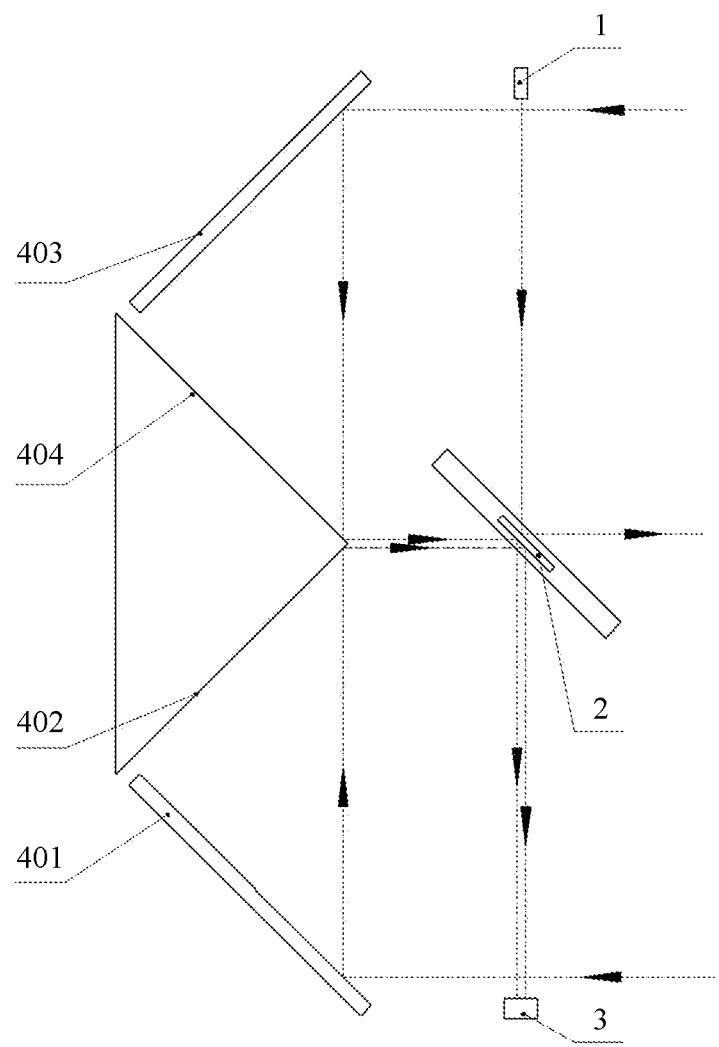
FIG. 6 is a schematic structural diagram of a laser radar according to an embodiment.

In the solutions provided in this embodiment of the present disclosure, as shown in FIG. 6, the third reflector 403 is configured to reflect, to the fourth reflector 404, the laser beam reflected back by the object. The fourth reflector 404 is configured to reflect, to the receiving reflective surface, the laser beam reflected by the third reflector 403.

As shown in FIG. 6, the second reflector 402 and the third reflector 403 may be made into a right-angle prism. An upper reflective surface of the prism is equivalent to the second reflector 402, and a lower reflective surface of the prism is equivalent to the third reflector 403. An included angle between the first reflector 401 and the upper reflective surface (namely, the second reflector 402) of the prism is 90°, an included angle between the fourth reflector 404 and the lower reflective surface (namely, the third reflector 403) of the prism is 90°, and an included angle between the upper reflective surface and the lower reflective surface of the prism is also 90°. The laser beam emitted by the light source 1 is emitted after being reflected by the emitting reflective surface of the scanning mirror 2. A part of the laser beam reflected back by the object is reflected by the first reflector 401 to the second reflector 402, reflected by the second reflector 402 to the receiving reflective surface of the scanning mirror 2, and then reflected by the receiving reflective surface of the scanning mirror 2 to the detector 3. The other part of the laser beam reflected back by the object is reflected by the third reflector 403 to the fourth reflector 404, reflected by the fourth reflector 404 to the receiving reflective surface of the scanning mirror 2, and then reflected by the receiving reflective surface of the scanning mirror 2 to the detector 3.

The reflector group divides the receiving field of view into two parts using two pairs of combined reflectors, and the two parts are respectively disposed on the two sides of the scanning mirror. This effectively reduces a distance between a received beam at an edge of the field of view and an emitted beam, and helps improve strength of a received signal, reduce a near-field blind spot, and increase the detection distance.

Figure 7:
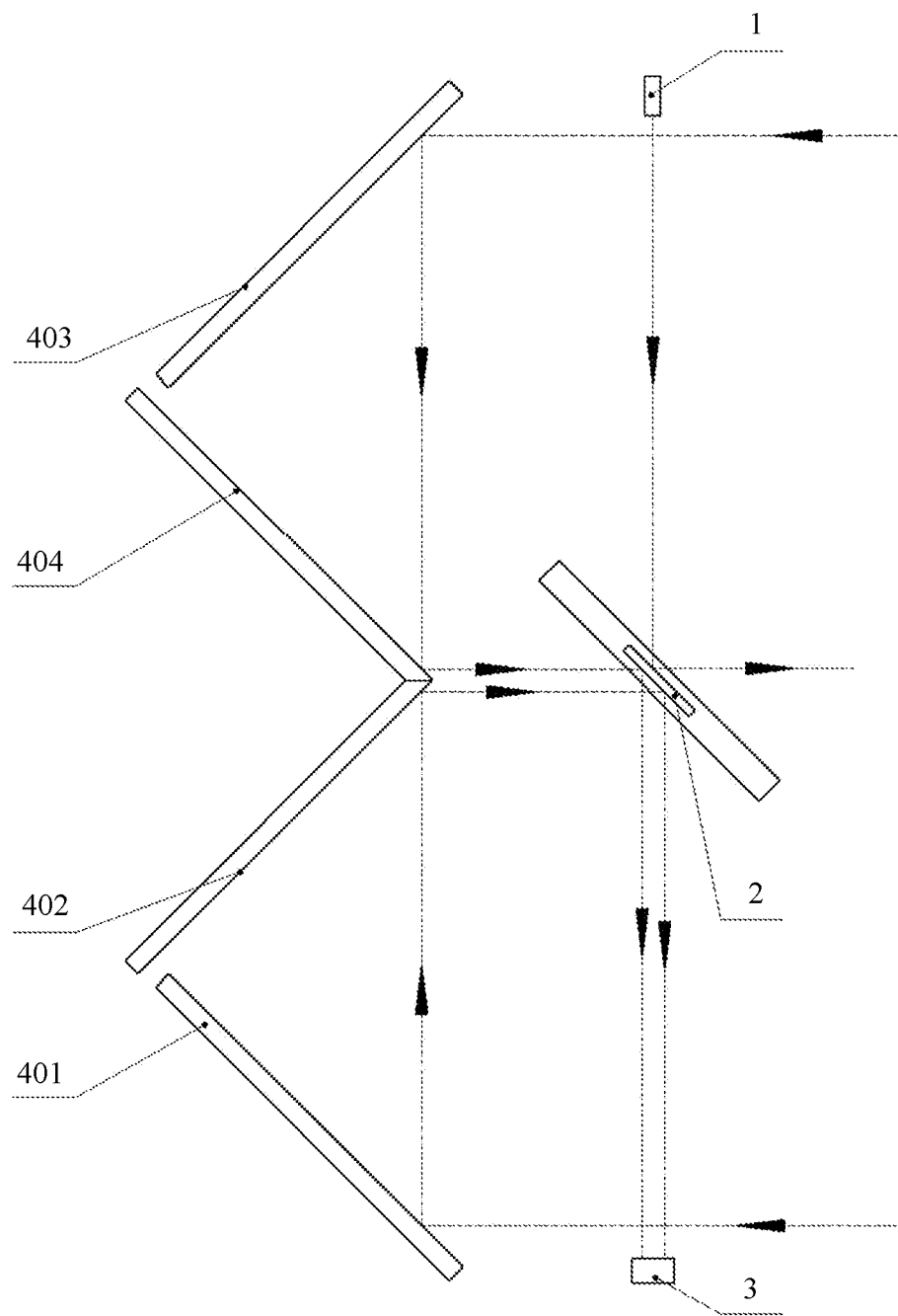
FIG. 7 is a schematic structural diagram of a laser radar according to an embodiment.
Figure 8:
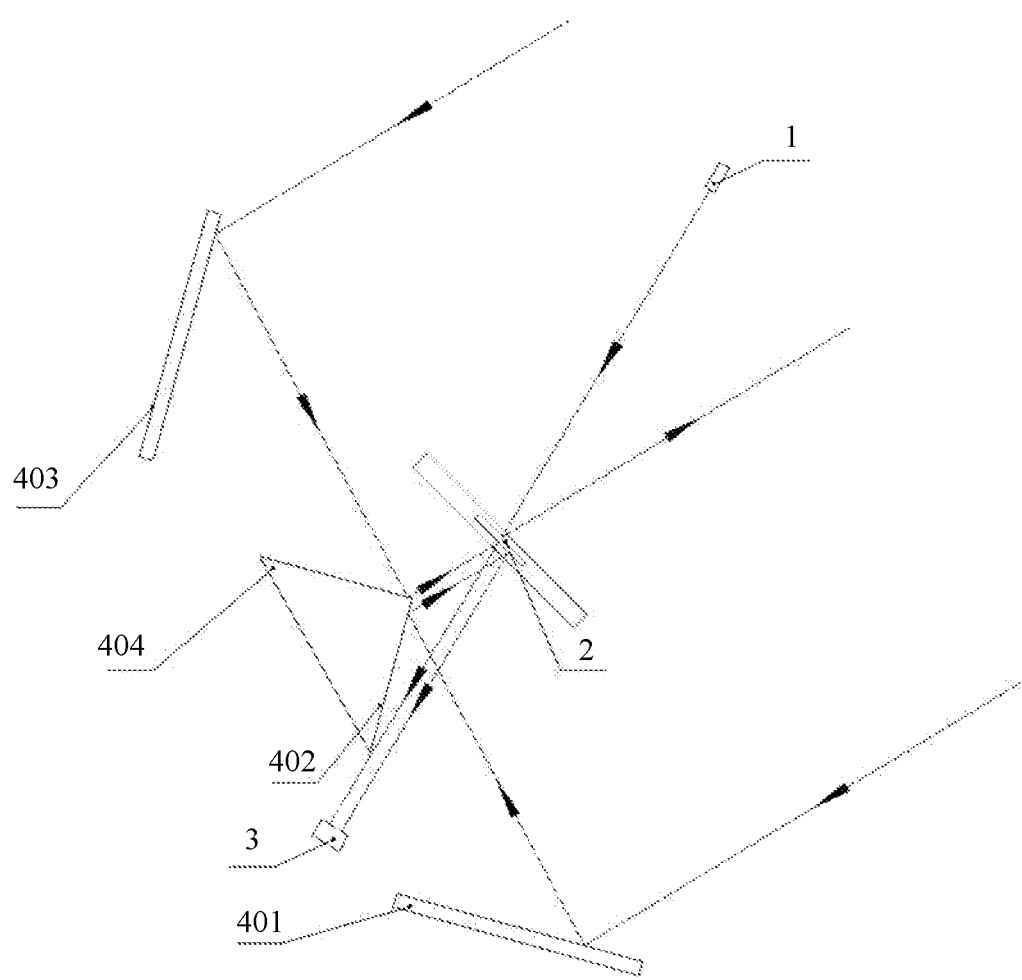
FIG. 8 is a schematic structural diagram of a laser radar according to an embodiment.

As shown in FIG. 7, the first reflector 401, the second reflector 402, the third reflector 403, and the fourth reflector 404 may alternatively be made into the four separate optical elements. The detector 3 may be flexibly disposed as required. As shown in FIG. 8, the detector 3 may be disposed between the first reflector 401 and the second reflector 402.

In a possible implementation, the laser radar further includes a first lens 5 and a second lens 6. The first lens 5 is disposed on the emission path of the light source 1, and configured to collimate or focus the laser beam received from the light source 1. The second lens 6 is disposed on the receiving path of the detector 3, and configured to focus the received laser beam and send the laser beam to the detector 3.

The first lens 5 may be a single collimation lens, a combination of a plurality of collimation cylindrical lenses, or a lens group including a plurality of lenses. The second lens 6 is a focusing lens. In design and use, the first lens 5 and the second lens 6 respectively match the light source 1 and the detector 3.

Figure 9:
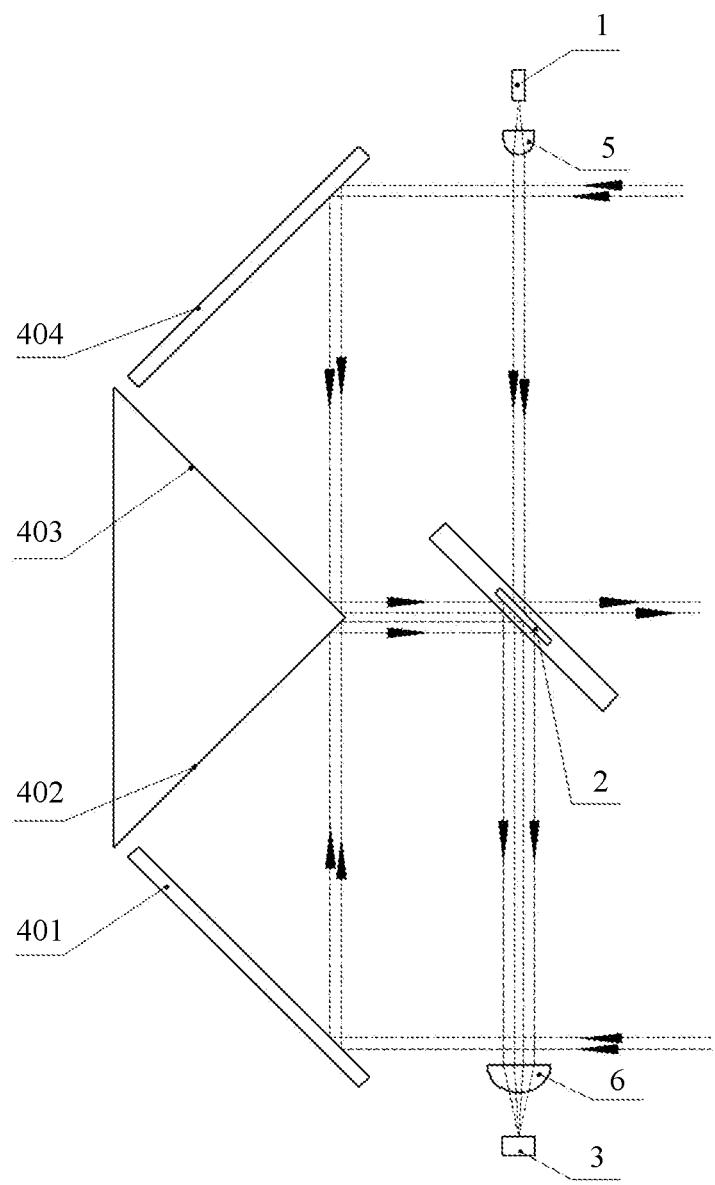
FIG. 9 is a schematic structural diagram of a laser radar according to an embodiment.

In the solutions provided in this embodiment of the present disclosure, as shown in FIG. 9, the laser beam emitted by the light source 1 is collimated by the first lens 5 onto the emitting reflective surface of the scanning mirror 2, and then is reflected and output by the emitting reflective surface. The laser beam reflected by the receiving reflective surface to the detector 3 is focused by the second lens 6 onto the detector 3.

In a possible implementation, the laser radar further includes a third lens 7 and a fourth lens 8. The third lens 7 is disposed on an emission path of the emitting reflective surface, and configured to collimate the laser beam received from the emitting reflective surface. The fourth lens 8 is disposed on a receiving path of the receiving reflective surface, and configured to focus the received laser beam and send the laser beam to the receiving reflective surface.

The third lens 7 and the fourth lens 8 are aspherical lenses or lens groups including a plurality of lenses, and can collimate laser beams incident from different directions. The third lens 7 and the fourth lens 8 should be of a same model or similar models, to implement angle synchronization between the emitted laser beam and the received laser beam.

Figure 10:
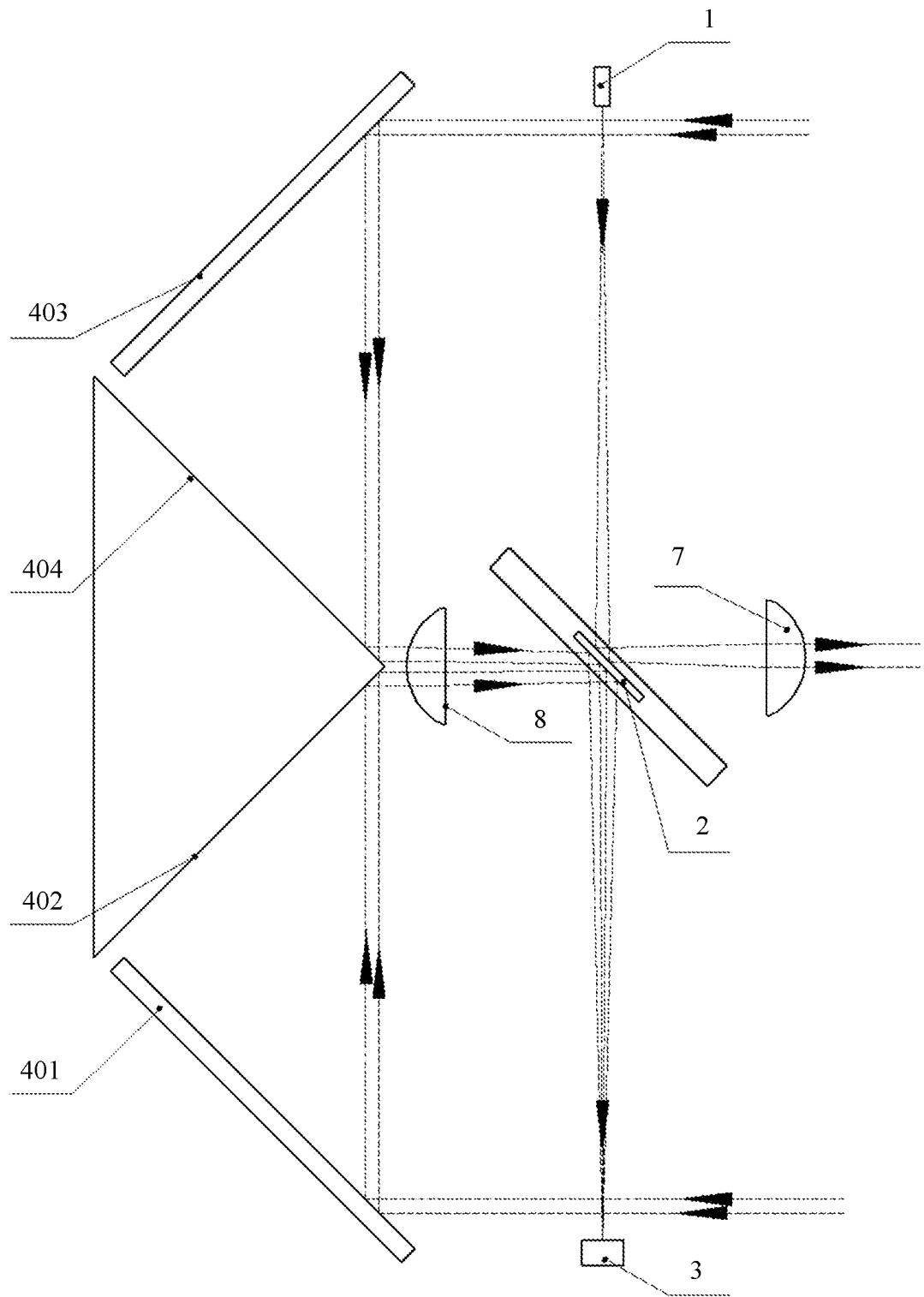
FIG. 10 is a schematic structural diagram of a laser radar according to an embodiment.

In the solutions provided in this embodiment of the present disclosure, as shown in FIG. 10, the laser beam emitted by the light source 1 is incident onto the emitting reflective surface of the scanning mirror 2 at a specific divergence angle, and then is collimated and output by the third lens 7. The laser beam reflected by the reflector group falls onto the receiving reflective surface after being focused by the fourth lens 8, and then is reflected and focused by the receiving reflective surface onto the detector 3. Based on the third lens 7 and the fourth lens 8, light spot area at the emitting end is increased, and the divergence angle is reduced. In addition, effective receiving area of the detector 3 is increased, and the detection distance is increased.

In a possible implementation, the laser radar further includes a first lens 5, a second lens 6, a third lens 7, and a fourth lens 8. The first lens 5 is disposed in front of the light source 1, and the second lens 6 is disposed in front of the detector 3. The third lens 7 is disposed on a reflection path of the emitting reflective surface, and the fourth lens 8 is disposed on a receiving path of the receiving reflective surface.

Figure 11:
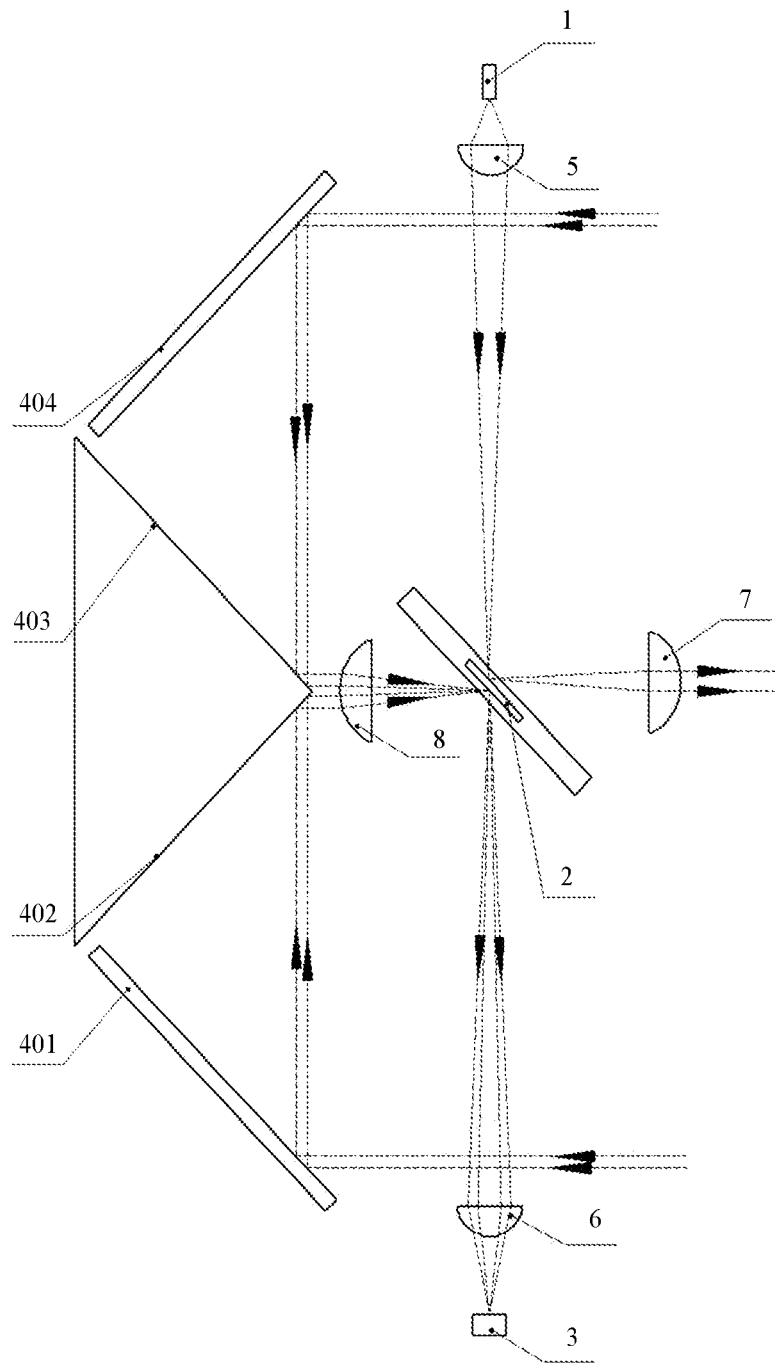
FIG. 11 is a schematic structural diagram of a laser radar according to an embodiment.

In the solutions provided in this embodiment of the present disclosure, as shown in FIG. 11, the laser beam emitted by the light source 1 is focused by the first lens 5 onto the emitting reflective surface of the scanning mirror 2, diverged by the emitting reflective surface and reflected to the third lens 7, collimated by the third lens 7, and then output. The laser beam reflected by the reflector group falls onto the receiving reflective surface after being focused by the fourth lens 8, diverged by the receiving reflective surface and reflected to the second lens 6, and then focused by the second lens 6 onto the detector 3. Based on the first lens 5, the second lens 6, the third lens 7, and the fourth lens 8, light spot area at the emitting end is increased, and the divergence angle is reduced. In addition, effective receiving area of the detector 3 is increased, and the detection distance is increased.

In the solutions provided in the foregoing embodiment, synchronous scanning and receiving in the one-dimensional direction can be implemented using a single detector 3. Synchronous scanning and receiving in the two-dimensional direction can be implemented only using a detector array. In technical solutions in the following embodiment, a reflector is added to the reflector group. In this way, synchronous scanning and receiving in the two-dimensional direction can be implemented using a single detector 3. Therefore, the quantity of optical elements in the laser radar is reduced, and practicability is high. Optionally, in the following embodiment, the included angle between the first reflector and the second reflector may be any value within an angle range that fluctuates around 90°, and the range may be 90°+5°. The included angle is preferably 90°.

In a possible implementation, the reflector group further includes a fifth reflector 405, where the fifth reflector 405 is perpendicular to the first reflector 401 and the second reflector 402.

In actual application, specific positions of the first reflector 401, the second reflector 402, and the fifth reflector 405 may be set as required. The following describes the present disclosure using two examples.

Figure 12:
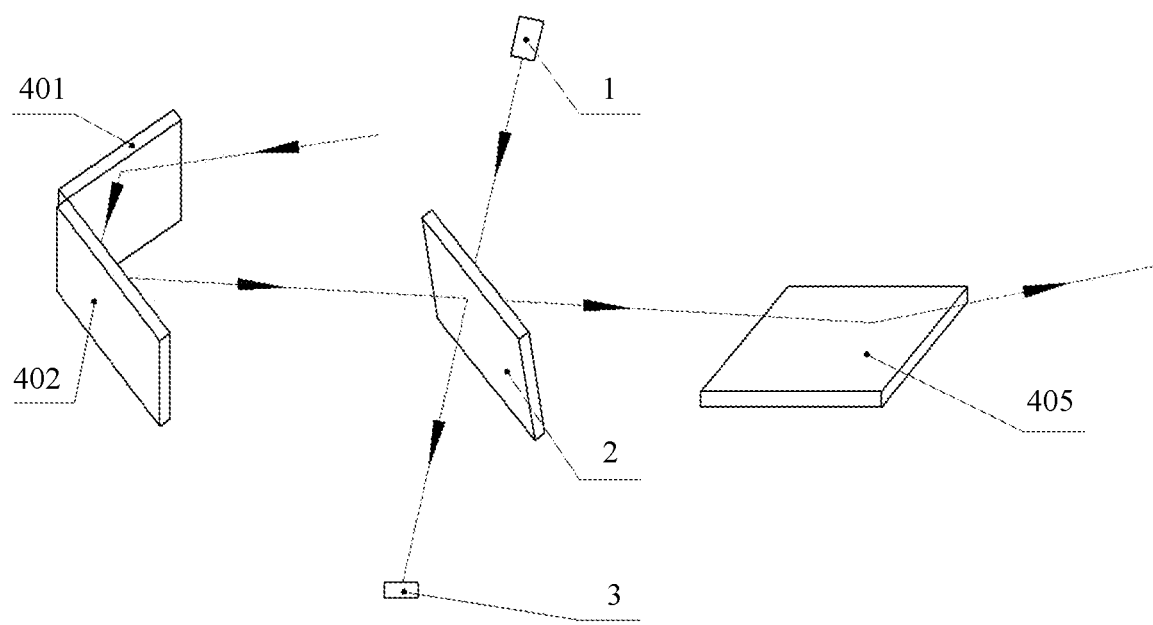
FIG. 12 is a schematic structural diagram of a laser radar according to an embodiment.

In a solution provided in this embodiment of the present disclosure, as shown in FIG. 12, the fifth reflector 405 is configured to reflect the laser beam reflected by the emitting reflective surface, to emit the reflected laser beam. The first reflector 401 is configured to reflect, to the second reflector 402, the laser beam reflected back by the object. The second reflector 402 is configured to reflect, to the receiving reflective surface, the laser beam reflected by the first reflector 401.

As shown in FIG. 12, the reflector group includes the fifth reflector 405 at the emitting end, and includes the first reflector 401 and the second reflector 402 at the receiving end. The laser beam emitted by the light source 1 is reflected by the emitting reflective surface of the scanning mirror 2 to the fifth reflector 405, reflected by the fifth reflector 405, mirrored once in a direction perpendicular to the fifth reflector 405, and then emitted. The laser beam reflected back by the object is reflected by the first reflector 401 to the second reflector 402, reflected by the second reflector 402 to the receiving reflective surface of the scanning mirror 2, diverted on the plane to which both the first reflector 401 and the second reflector 402 are perpendicular, and then reflected by the receiving reflective surface of the scanning mirror 2 to the detector 3. Finally, the laser beam incident onto the receiving reflective surface is parallel to the laser beam emitted by the emitting reflective surface. Therefore, only one detector 3 is required to complete synchronous scanning and receiving in the two-dimensional direction, and no detector array is required. In this way, the laser radar has the small quantity of optical elements, has the simple optical path structure, and is highly practical.

Figure 13:
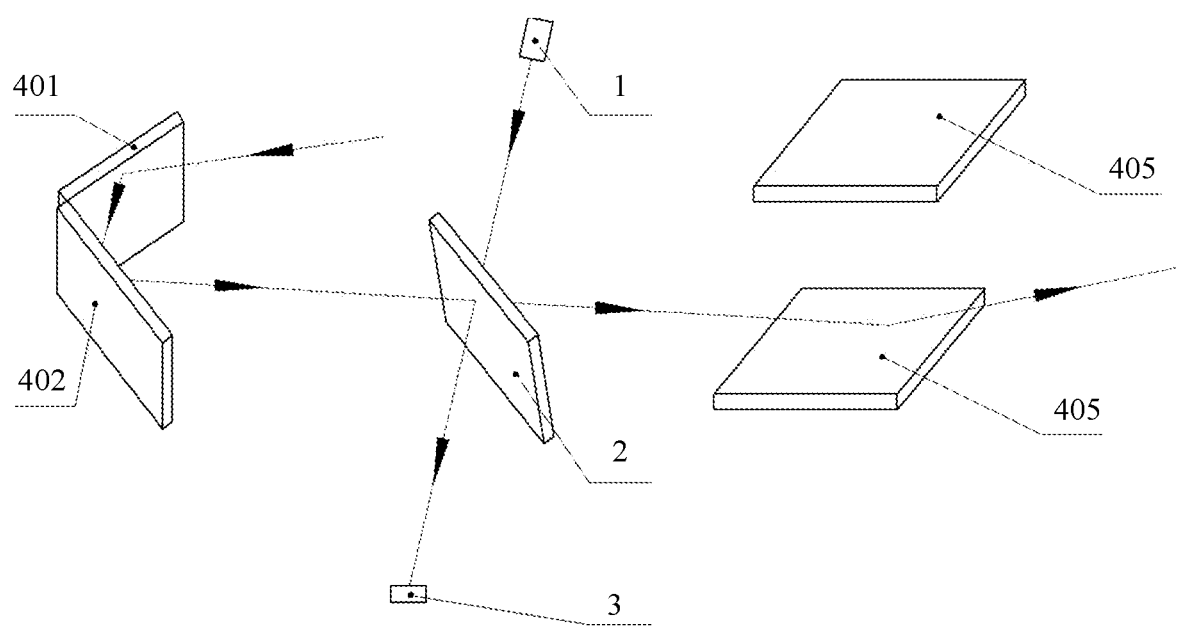
FIG. 13 is a schematic structural diagram of a laser radar according to an embodiment.
Figure 14:
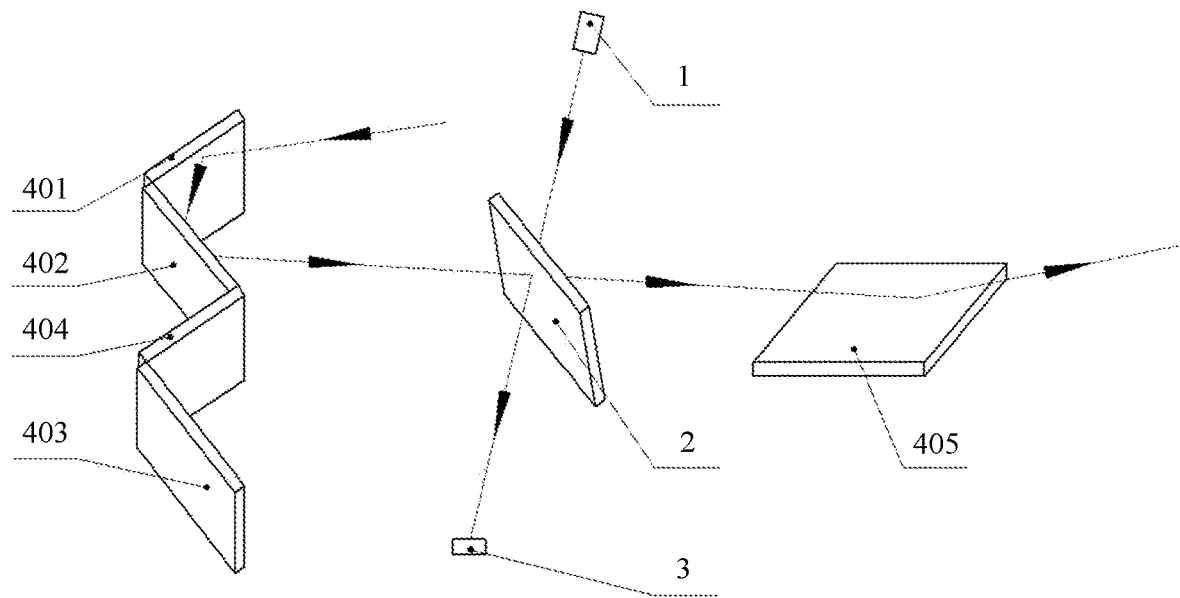
FIG. 14 is a schematic structural diagram of a laser radar according to an embodiment.

In addition, a quantity and positions of fifth reflectors 405 may be set as required. For example, to increase a scanning field of view, one fifth reflector 405 may be disposed on each of upper and lower sides of the scanning mirror 2, as shown in FIG. 13. In actual application, to increase the receiving field of view, the reflector group may further include the third reflector 403 and the fourth reflector 404, as shown in FIG. 14.

Figure 15:
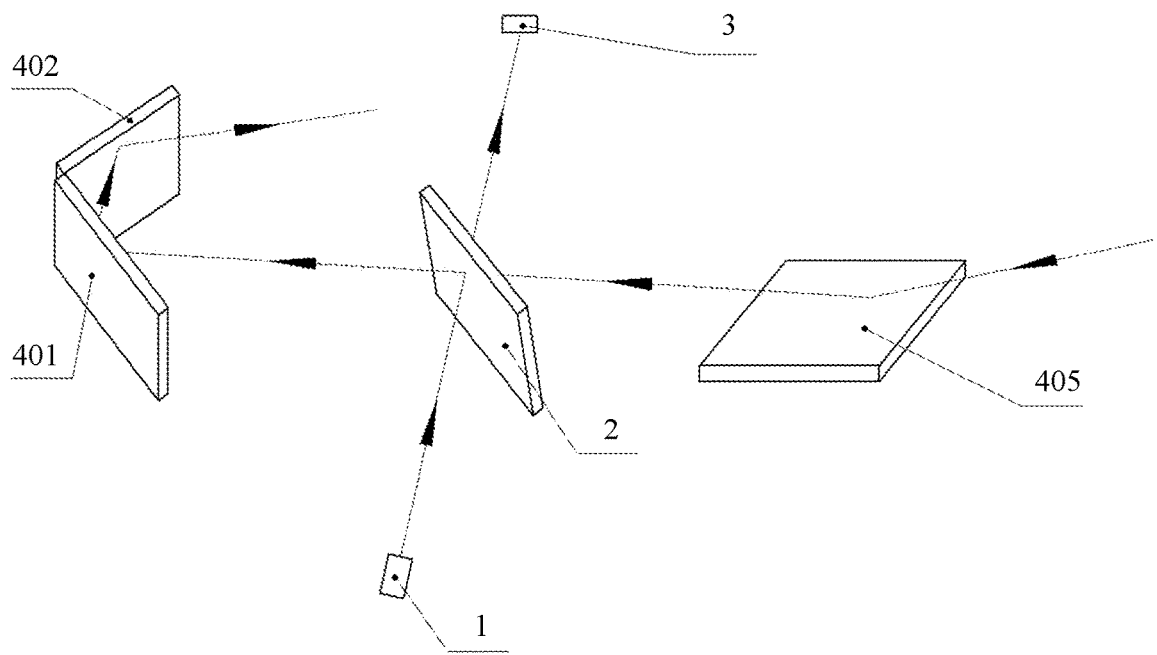
FIG. 15 is a schematic structural diagram of a laser radar according to an embodiment.

In a solution provided in this embodiment of the present disclosure, as shown in FIG. 15, the first reflector 401 is configured to reflect, to the second reflector 402, the laser beam reflected by the emitting reflective surface. The second reflector 402 is configured to reflect the laser beam reflected by the first reflector 401, to emit the reflected laser beam. The fifth reflector 405 is configured to reflect, to the receiving reflective surface, the laser beam reflected back by the object.

As shown in FIG. 15, the reflector group includes the first reflector 401 and the second reflector 402 at the emitting end, and includes the fifth reflector 405 at the receiving end. The laser beam emitted by the light source 1 is reflected by the emitting reflective surface of the scanning mirror 2 to the first reflector 401, reflected by the first reflector 401 to the second reflector 402, and then emitted after being reflected by the second reflector 402. The laser beam is diverted on the plane to which both the first reflector 401 and the second reflector 405 are perpendicular. The laser beam reflected back by the object is reflected by the fifth reflector 405 to the receiving reflective surface of the scanning mirror 2, mirrored once in a direction perpendicular to the fifth reflector 405, and then reflected by the receiving reflective surface of the scanning mirror 2 to the detector 3. Finally, the laser beam incident onto the receiving reflective surface is parallel to the laser beam emitted by the emitting reflective surface. Therefore, only one detector 3 is required to complete synchronous scanning and receiving in the two-dimensional direction, and no detector array is required. In this way, the laser radar has the small quantity of optical elements, has the simple optical path structure, and is highly practical.

In a solution provided in this embodiment of the present disclosure, the first reflector is configured to reflect the laser beam reflected by the emitting reflective surface, to emit the reflected laser beam. The fifth reflector is configured to reflect, to the second reflector, the laser beam reflected back by the object. The second reflector is configured to reflect, to the receiving reflective surface, the laser beam reflected by the fifth reflector.

The reflector group includes the first reflector at the emitting end, and includes the second reflector and the fifth reflector at the receiving end. The laser beam emitted by the light source is reflected by the emitting reflective surface of the scanning mirror to the first reflector, and then emitted after being reflected by the first reflector. The laser beam reflected back by the object is reflected by the fifth reflector to the second reflector, and then reflected by the second reflector to the receiving reflective surface of the scanning mirror. Finally, the laser beam incident onto the receiving reflective surface is parallel to the laser beam emitted by the emitting reflective surface. Therefore, only one detector is required to complete synchronous scanning and receiving in the two-dimensional direction, and no detector array is required. In this way, the laser radar has the small quantity of optical elements, has the simple optical path structure, and is highly practical.

In a possible implementation, the reflector group further includes a sixth reflector 406, a seventh reflector 407, and an eighth reflector 408. An included angle formed between the sixth reflector 406 and the seventh reflector 407 is equal to the included angle formed between the first reflector 401 and the second reflector 402. The first reflector 401 and the second reflector 402 are perpendicular to a first plane. The sixth reflector 406 and the seventh reflector 407 are perpendicular to a second plane. The second plane is perpendicular to the first plane. The eighth reflector 408 is perpendicular to the first plane and the second plane.

In actual application, specific positions of the first reflector 401, the second reflector 402, the sixth reflector 406, the seventh reflector 407, and the eighth reflector 408 may be set as required. Example positions that are set may be described as follows.

In a solution provided in this embodiment of the present disclosure, the first reflector is configured to reflect, to the second reflector, the laser beam reflected by the emitting reflective surface of the scanning mirror. The second reflector is configured to reflect, to the eighth reflector, the laser beam reflected by the first reflector. The eighth reflector is configured to reflect, to the sixth reflector, the laser beam reflected by the second reflector. The sixth reflector is configured to reflect, to the seventh reflector, the laser beam reflected by the eighth reflector. The seventh reflector is configured to reflect the laser beam reflected by the sixth reflector, to emit the reflected laser beam. The laser beam reflected back by the object is directly incident onto the receiving reflective surface of the scanning mirror.

In a solution provided in this embodiment of the present disclosure, the first reflector is configured to reflect, to the second reflector, the laser beam reflected back by the object. The second reflector is configured to reflect, to the eighth reflector, the laser beam reflected by the first reflector. The eighth reflector is configured to reflect, to the sixth reflector, the laser beam reflected by the second reflector. The sixth reflector is configured to reflect, to the seventh reflector, the laser beam reflected by the eighth reflector. The seventh reflector is configured to reflect, to the receiving reflective surface of the scanning mirror, the laser beam reflected by the sixth reflector.

In a solution provided in this embodiment of the present disclosure, the first reflector is configured to reflect, to the second reflector, the laser beam reflected by the emitting reflective surface of the scanning mirror. The second reflector is configured to reflect, to the sixth reflector, the laser beam reflected by the first reflector. The sixth reflector is configured to reflect, to the seventh reflector, the laser beam reflected by the second reflector. The seventh reflector is configured to reflect, to the eighth reflector, the laser beam reflected by the sixth reflector. The eighth reflector is configured to reflect the laser beam reflected by the seventh reflector, to emit the reflected laser beam. The laser beam reflected back by the object is directly incident onto the receiving reflective surface of the scanning mirror.

Figure 16:
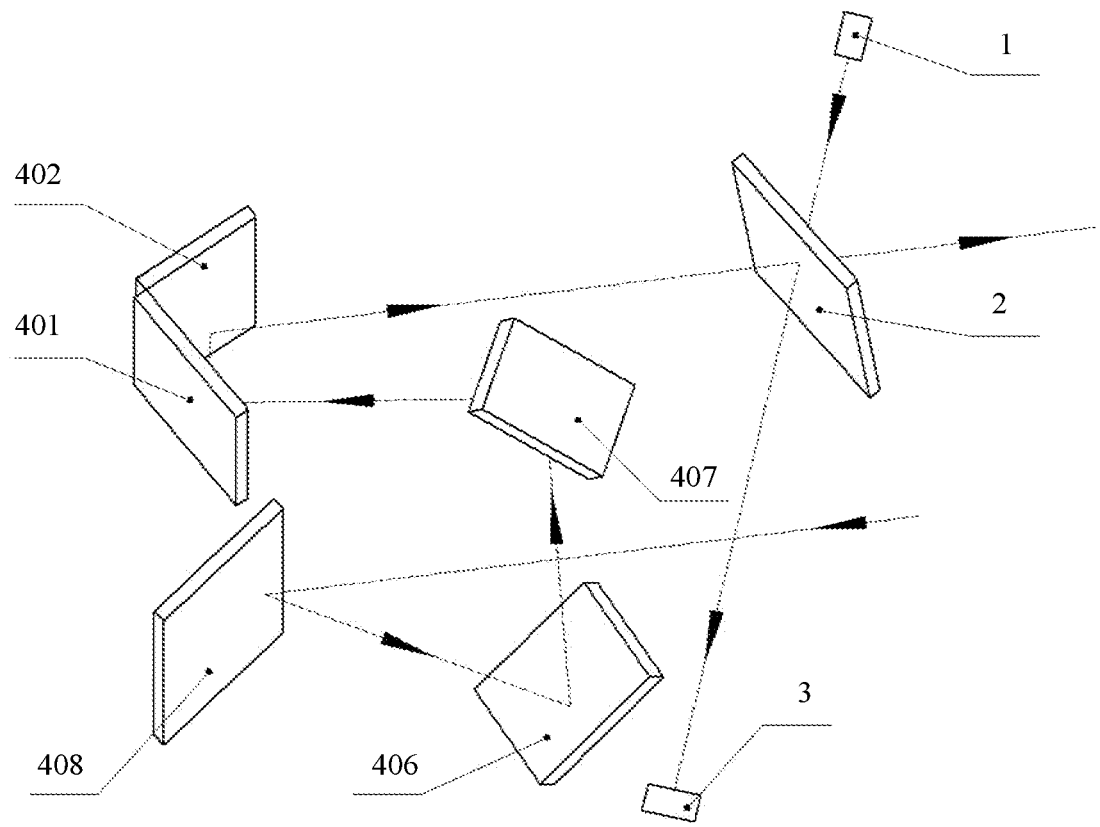
FIG. 16 is a schematic structural diagram of a laser radar according to an embodiment.

In a solution provided in this embodiment of the present disclosure, as shown in FIG. 16, the eighth reflector 408 is configured to reflect, to the sixth reflector 406, the laser beam reflected back by the object. The sixth reflector 406 is configured to reflect, to the seventh reflector 407, the laser beam reflected by the eighth reflector 408. The seventh reflector 407 is configured to reflect, to the first reflector 401, the laser beam reflected by the sixth reflector 406. The first reflector 401 is configured to reflect, to the second reflector 402, the laser beam reflected by the seventh reflector 407. The second reflector 402 is configured to reflect, to the receiving reflective surface, the laser beam reflected by the first reflector 401.

As shown in FIG. 16, the reflector group includes the first reflector 401, the second reflector 402, the sixth reflector 406, the seventh reflector 407, and the eighth reflector 408 at the receiving end. The laser beam emitted by the light source 1 is emitted after being reflected by the emitting reflective surface of the scanning mirror 2. The laser beam reflected back by the object is mirrored once on the eighth reflector 408 and reflected by the eighth reflector 408 to the sixth reflector 406, reflected by the sixth reflector 406 to the seventh reflector 407, reflected by the seventh reflector 407 to the first reflector 401 and diverted on the second plane, reflected by the first reflector 401 to the second reflector 402, reflected by the second reflector 402 to the receiving reflective surface and diverted on the first plane, and then reflected by the receiving reflective surface to the detector 3. Finally, the laser beam incident onto the receiving reflective surface is parallel to the laser beam emitted by the emitting reflective surface. Therefore, only one detector 3 is used to implement synchronous scanning and receiving in the two-dimensional direction. In this way, the laser radar has the relatively small quantity of optical elements and is highly practical.

In a solution provided in this embodiment of the present disclosure, the first reflector is configured to reflect, to the second reflector, the laser beam reflected by the emitting reflective surface of the scanning mirror 2. The second reflector is configured to reflect, to the sixth reflector, the laser beam reflected by the first reflector. The sixth reflector is configured to reflect, to the seventh reflector, the laser beam reflected by the second reflector. The seventh reflector is configured to reflect the laser beam reflected by the sixth reflector, to emit the reflected laser beam. The eighth reflector is configured to reflect, to the receiving reflective surface of the scanning mirror 2, the laser beam reflected back by the object.

In a solution provided in this embodiment of the present disclosure, the eighth reflector is configured to reflect the laser beam reflected by the emitting reflective surface of the scanning mirror 2, to emit the reflected laser beam. The first reflector is configured to reflect, to the second reflector, the laser beam reflected back by the object. The second reflector is configured to reflect, to the sixth reflector, the laser beam reflected by the first reflector. The sixth reflector is configured to reflect, to the seventh reflector, the laser beam reflected by the second reflector. The seventh reflector is configured to reflect, to the receiving reflective surface of the scanning mirror 2, the laser beam reflected by the sixth reflector.

In a solution provided in this embodiment of the present disclosure, the sixth reflector is configured to reflect, to the seventh reflector, the laser beam reflected by the emitting reflective surface. The seventh reflector is configured to reflect the laser beam reflected by the sixth reflector, to emit the reflected laser beam. The first reflector is configured to reflect, to the second reflector, the laser beam reflected back by the object. The second reflector is configured to reflect, to the eighth reflector, the laser beam reflected by the first reflector. The eighth reflector is configured to reflect, to the receiving reflective surface of the scanning mirror 2, the laser beam reflected by the second reflector.

Figure 17:
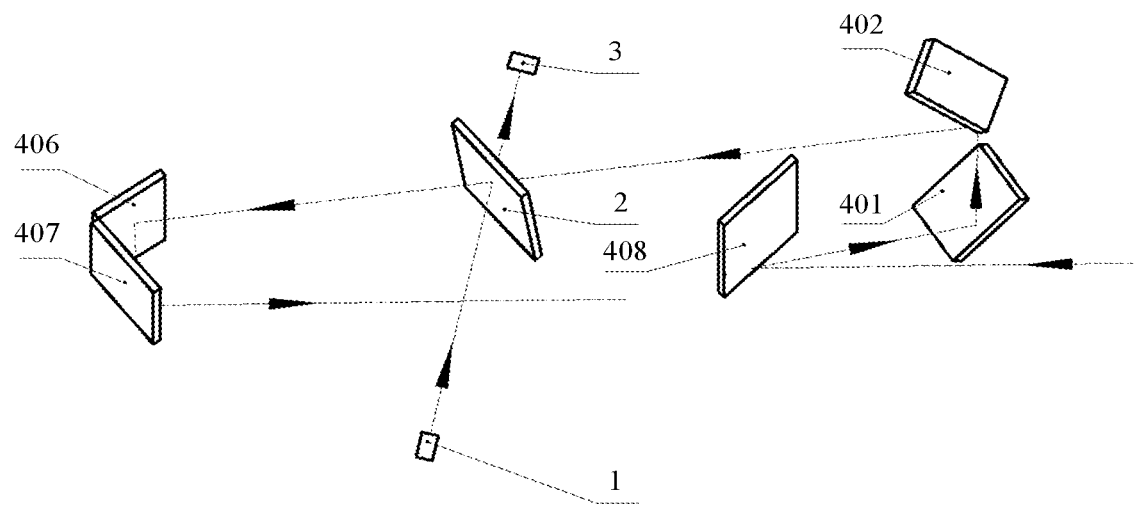
FIG. 17 is a schematic structural diagram of a laser radar according to an embodiment.

In a solution provided in this embodiment of the present disclosure, as shown in FIG. 17, the sixth reflector 406 is configured to reflect, to the seventh reflector 407, the laser beam reflected by the emitting reflective surface. The seventh reflector 407 is configured to reflect the laser beam reflected by the sixth reflector 406, to emit the reflected laser beam. The eighth reflector 408 is configured to reflect, to the first reflector 401, the laser beam reflected back by the object. The first reflector 401 is configured to reflect, to the second reflector 402, the laser beam reflected by the eighth reflector 408. The second reflector 402 is configured to reflect, to the receiving reflective surface, the laser beam reflected by the first reflector 401.

As shown in FIG. 17, the reflector group includes the sixth reflector 406 and the seventh reflector 407 at the emitting end, and includes the first reflector 401, the second reflector 402, and the eighth reflector 408 at the receiving end. The laser beam emitted by the light source 1 is reflected by the emitting reflective surface to the sixth reflector 406, reflected by the sixth reflector 406 to the seventh reflector 407, and then emitted after being reflected by the seventh reflector 407. In addition, the laser beam is diverted on the second plane. The laser beam reflected back by the object is mirrored by the eighth reflector 408 and reflected by the eighth reflector 408 to the first reflector 401, reflected by the first reflector 401 to the second reflector 402, reflected by the second reflector 402 to the receiving reflective surface and diverted on the first plane, and then reflected by the receiving reflective surface to the detector 3. Finally, the laser beam incident onto the receiving reflective surface is parallel to the laser beam emergent from the emitting reflective surface. Therefore, only one detector 3 is used to implement synchronous scanning and receiving in the two-dimensional direction. In this way, the laser radar has the relatively small quantity of optical elements and is highly practical.

In a solution provided in this embodiment of the present disclosure, the eighth reflector is configured to reflect, to the sixth reflector, the laser beam reflected by the emitting reflective surface. The sixth reflector is configured to reflect, to the seventh reflector, the laser beam reflected by the eighth reflector. The seventh reflector is configured to reflect the laser beam reflected by the sixth reflector, to emit the reflected laser beam. The first reflector is configured to reflect, to the second reflector, the laser beam reflected back by the object. The second reflector is configured to reflect, to the receiving reflective surface of the scanning mirror 2, the laser beam reflected by the first reflector.

Figure 18:
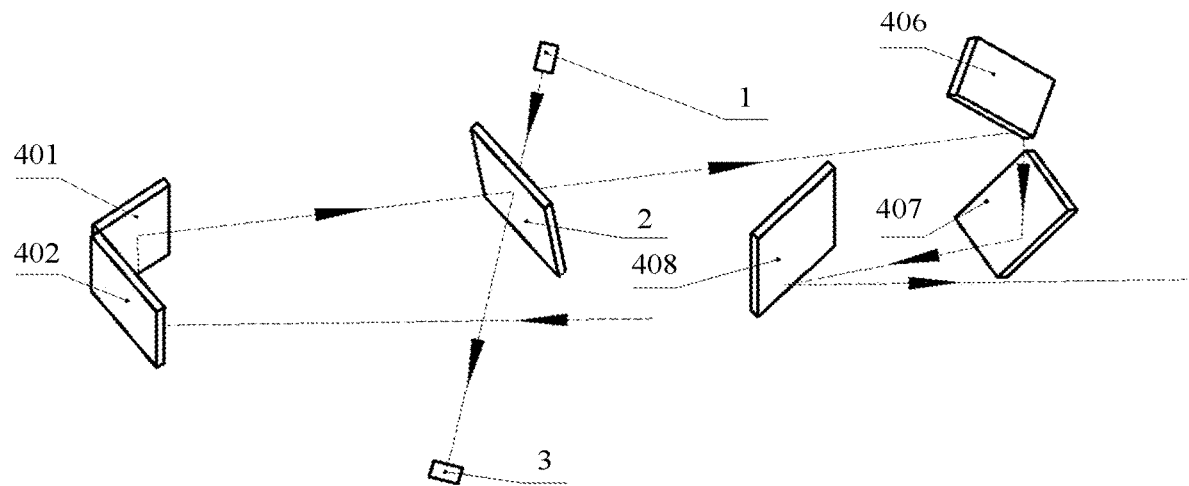
FIG. 18 is a schematic structural diagram of a laser radar according to an embodiment.

In a solution provided in this embodiment of the present disclosure, as shown in FIG. 18, the sixth reflector 406 is configured to reflect, to the seventh reflector 407, the laser beam reflected by the emitting reflective surface. The seventh reflector 407 is configured to reflect, to the eighth reflector 408, the laser beam reflected by the sixth reflector 406. The eighth reflector 408 is configured to reflect the laser beam reflected by the seventh reflector 407, to emit the reflected laser beam. The first reflector 401 is configured to reflect, to the second reflector 402, the laser beam reflected back by the object. The second reflector 402 is configured to reflect, to the receiving reflective surface, the laser beam reflected by the first reflector 401.

As shown in FIG. 18, the reflector group includes the sixth reflector 406, the seventh reflector 407, and the eighth reflector 408 at the emitting end, and includes the first reflector 401 and the second reflector 402 at the receiving end. The laser beam emitted by the light source 1 is reflected by the emitting reflective surface to the sixth reflector 406, reflected by the sixth reflector 406 to the seventh reflector 407, reflected by the seventh reflector 407 to the eighth reflector 408, and then mirrored and emitted by the eighth reflector 408. In addition, the laser beam is diverted on the second plane. The laser beam reflected back by the object is reflected by the first reflector 401 to the second reflector 402, reflected by the second reflector 402 to the receiving reflective surface and diverted on the first plane, and then reflected by the receiving reflective surface to the detector 3. Finally, the laser beam incident onto the receiving reflective surface is parallel to the laser beam emitted by the emitting reflective surface. Therefore, only one detector 3 is used to implement synchronous scanning and receiving in the two-dimensional direction. In this way, the laser radar has the relatively small quantity of optical elements and is highly practical.

Figure 19:
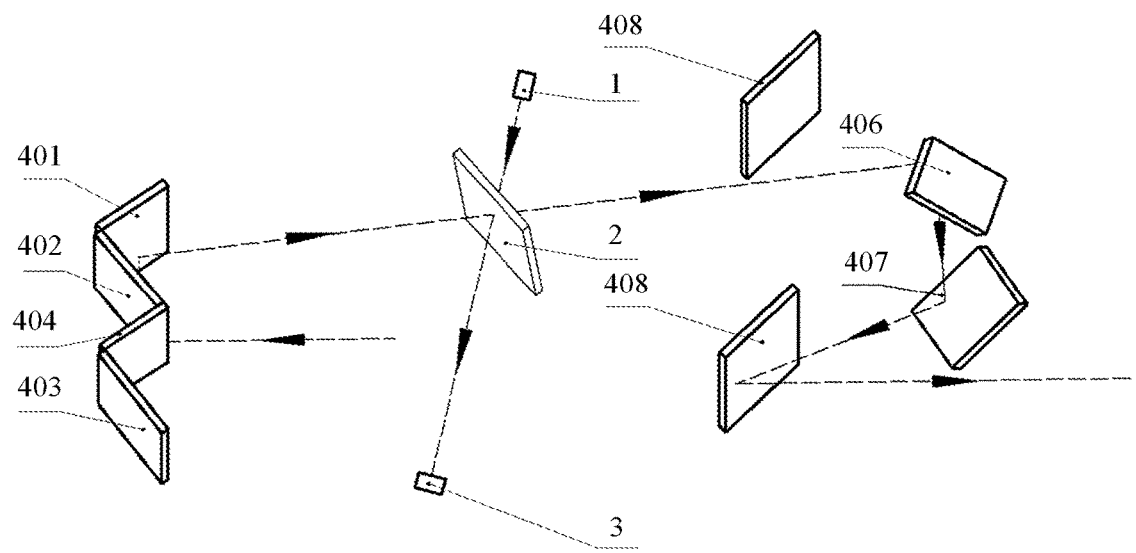
FIG. 19 is a schematic structural diagram of a laser radar according to an embodiment.

In actual application, the reflector group may further include the third reflector and the fourth reflector, to increase the receiving field of view, and may further include two eighth reflectors, to increase the scanning field of view, as shown in FIG. 19.

Figure 20:
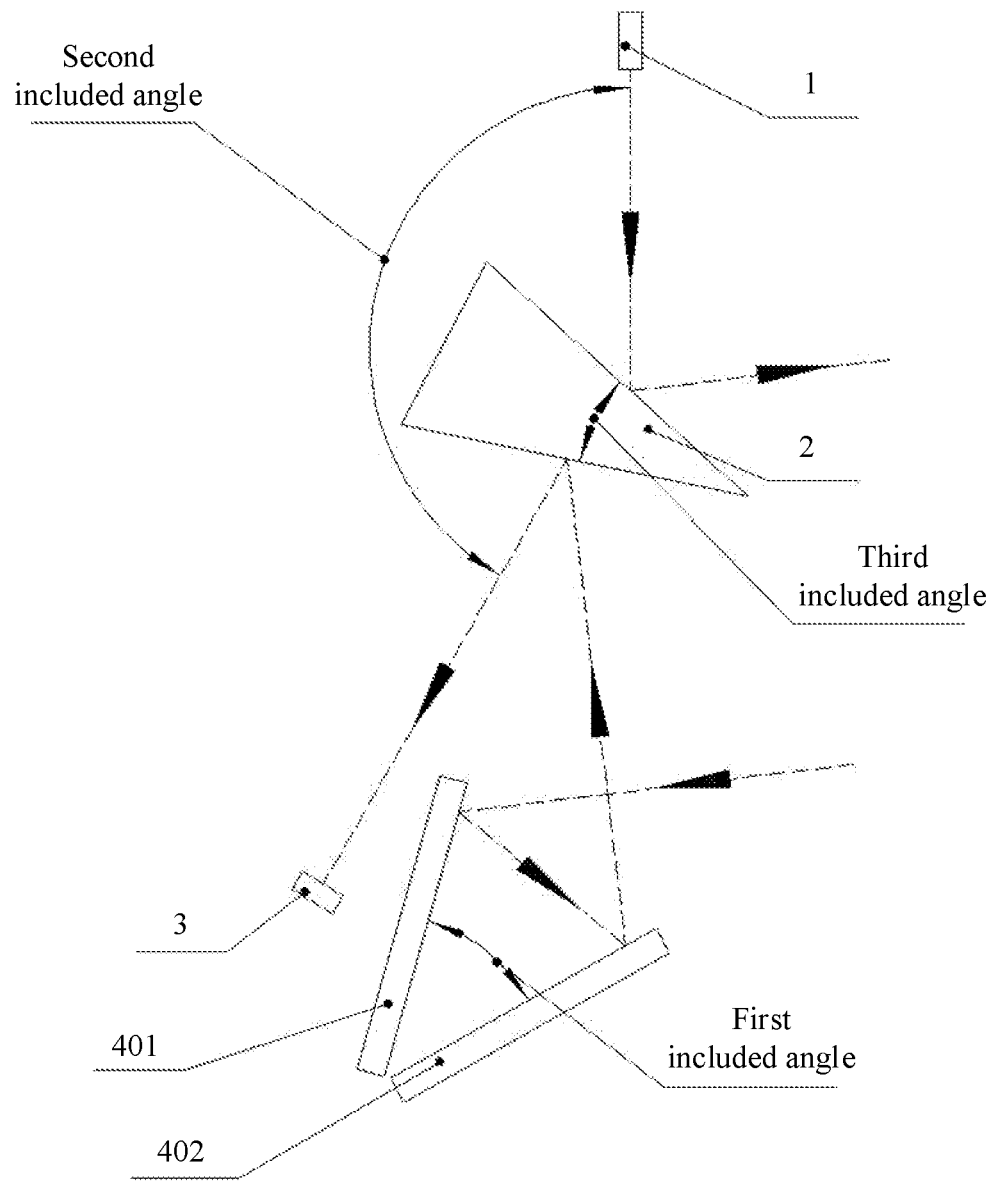
FIG. 20 is a schematic structural diagram of a laser radar according to an embodiment.
Figure 21:
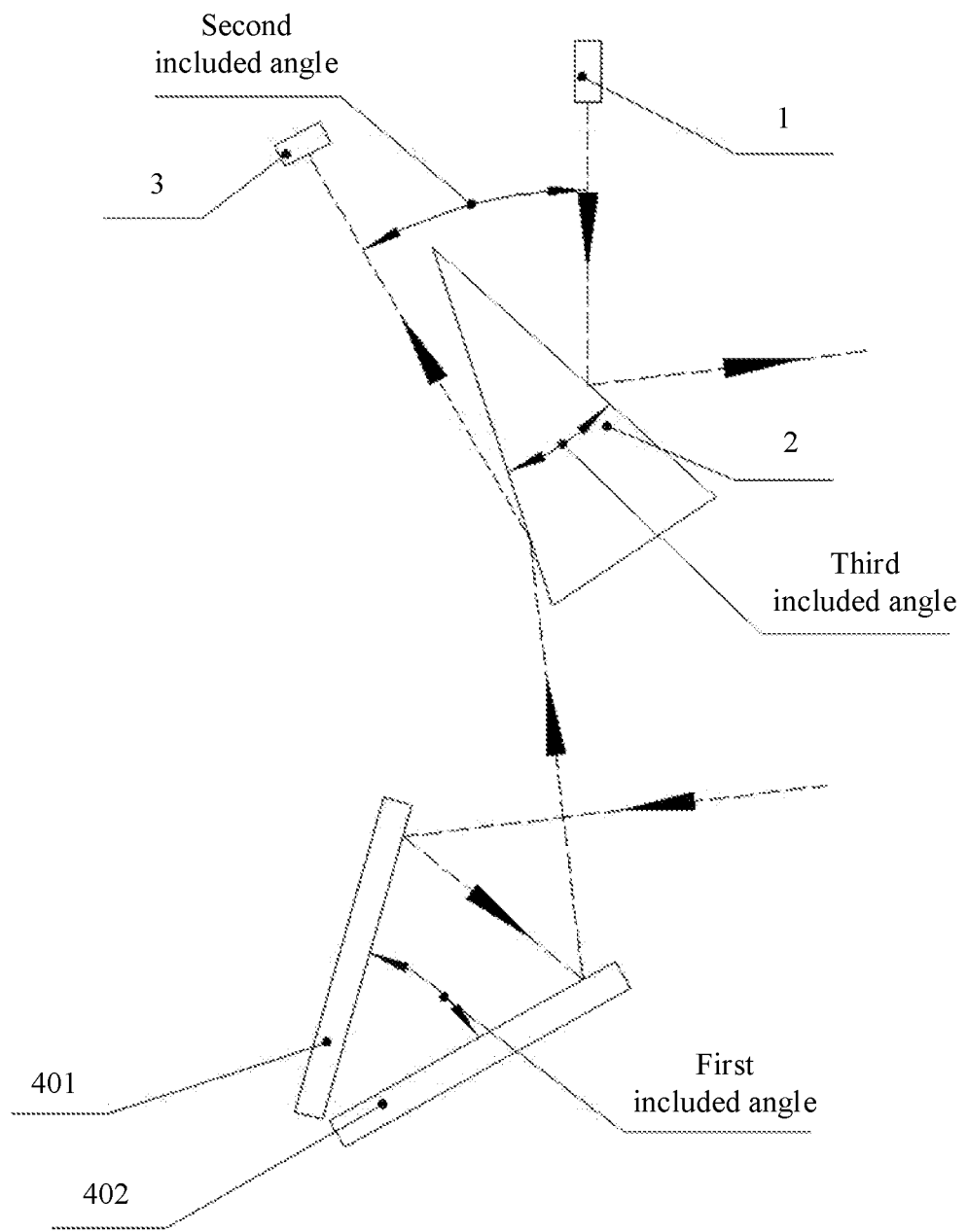
FIG. 21 is a schematic structural diagram of a laser radar according to an embodiment.

An embodiment of the present disclosure provides a laser radar. As shown in FIG. 20 and FIG. 21, the laser radar includes a light source 1, a scanning mirror 2, a detector 3, and a reflector group. The scanning mirror 2 includes an emitting reflective surface and a receiving reflective surface, and an included angle between the emitting reflective surface and the receiving reflective surface is a third included angle. The reflector group includes a first reflector 401 and a second reflector 402, and the first reflector 401 and the second reflector 402 are perpendicular to a same plane. An included angle between the first reflector 401 and the second reflector 402 is a first included angle, and an included angle between an incident laser beam of the emitting reflective surface and an emergent laser beam of the receiving reflective surface is a second included angle. When an included angle between a laser beam incident onto the receiving reflective surface and the receiving reflective surface is greater than an included angle between the laser beam incident onto the receiving reflective surface and the emitting reflective surface, the second included angle is twice a sum of the first included angle and the third included angle. Alternatively, when an included angle between a laser beam incident onto the receiving reflective surface and the receiving reflective surface is less than an included angle between the laser beam incident onto the receiving reflective surface and the emitting reflective surface, the second included angle is twice a difference between the first included angle and the third included angle. The emitting reflective surface is configured to reflect the laser beam emitted by the light source. The receiving reflective surface is configured to reflect, to the detector 3, the laser beam reflected back by an object. The first reflector 401 and the second reflector 402 are configured to change a propagation direction of the laser beam.

The light source 1, the scanning mirror 2, the detector 3, and the reflector group are consistent with those described in the foregoing embodiment, and details are not described herein again.

In a solution provided in this embodiment of the present disclosure, as shown in FIG. 20 and FIG. 21, the first reflector 401 is configured to reflect, to the second reflector 402, the laser beam reflected back by the object. The second reflector 402 is configured to reflect, to the receiving reflective surface, the laser beam reflected by the first reflector 401.

As shown in FIG. 20 and FIG. 21, the reflector group includes the first reflector 401 and the second reflector 402 at a receiving end. The laser beam emitted by the light source 1 is emitted by the emitting reflective surface of the scanning mirror 2. The laser beam reflected back by the object is reflected by the first reflector 401 to the second reflector 402, reflected by the second reflector 402 to the receiving reflective surface of the scanning mirror 2, and then reflected by the receiving reflective surface of the scanning mirror 2 to the detector 3.

As shown in FIG. 20, the included angle between the laser beam incident onto the receiving reflective surface and the receiving reflective surface is greater than the included angle between the laser beam incident onto the receiving reflective surface and the emitting reflective surface. In this case, the second included angle is twice the sum of the first included angle and the third included angle.

As shown in FIG. 21, the included angle between the laser beam incident onto the receiving reflective surface and the receiving reflective surface is less than the included angle between the laser beam incident onto the receiving reflective surface and the emitting reflective surface. In this case, the second included angle is twice the difference between the first included angle and the third included angle.

In the solution provided in this embodiment of the present disclosure, as shown in FIG. 20 and FIG. 21, usually it may be approximately considered that the laser beam emitted by the laser radar is parallel to the laser beam reflected back by the object. The second included angle between the laser beam incident onto the emitting reflective surface of the scanning mirror 2 and the laser beam reflected by the receiving reflective surface, and the first included angle between the first reflector and the second reflector satisfy a specific relationship. Therefore, when the first reflector and the second reflector are fixed, and an angle of the laser beam incident onto the emitting reflective surface of the scanning mirror 2 is unchanged, an angle of the laser beam reflected by the receiving reflective surface also keeps unchanged. In other words, when the scanning mirror 2 rotates in parallel to axes of the first reflector and the second reflector, a direction of the laser beam reflected by the receiving reflective surface does not change with the rotation of the scanning mirror 2. The laser radar provided in this embodiment of the present disclosure implements synchronous scanning and receiving. In other words, provided that an angle of the laser beam emitted by the light source 1 keeps unchanged, an angle of the laser beam received by the detector 3 also keeps unchanged regardless of how the scanning mirror 2 rotates in a one-dimensional direction.

In this solution, two surfaces of the scanning mirror 2 of the laser radar are reflective surfaces, in other words, the scanning mirror 2 has the receiving reflective surface and the emitting reflective surface. This is different from a technical solution in a related technology. The emitted laser beam and the reflected laser beam are located on two sides of the scanning mirror 2 respectively, to implement separation. This avoids crosstalk between the two laser beams, and lowers an assembling and commissioning requirement.

In a possible implementation, the reflector group further includes a fifth reflector, where the fifth reflector is perpendicular to the first reflector and the second reflector. Specific positions of the first reflector, the second reflector, and the fifth reflector are consistent with the example positions described in the foregoing embodiment, and details are not described herein again.

In a possible implementation, the reflector group further includes a sixth reflector, a seventh reflector, and an eighth reflector. An included angle formed between the sixth reflector and the seventh reflector is equal to the included angle formed between the first reflector and the second reflector. The first reflector and the second reflector are perpendicular to a first plane. The sixth reflector and the seventh reflector are perpendicular to a second plane. The second plane is perpendicular to the first plane. The eighth reflector is perpendicular to the first plane and the second plane. Specific positions of the first reflector, the second reflector, the sixth reflector, the seventh reflector, and the eighth reflector are consistent with the example positions described in the foregoing embodiment, and details are not described herein again.

In a possible implementation, the laser radar further includes a first lens 5 and a second lens 6. The first lens 5 is disposed on an emission path of the light source 1, and configured to collimate or focus the laser beam received from the light source 1. The second lens 6 is disposed on a receiving path of the detector 3, and configured to focus the received laser beam and send the laser beam to the detector 3.

In a possible implementation, the laser radar further includes a third lens 7 and a fourth lens 8. The third lens 7 is disposed on an emission path of the emitting reflective surface, and configured to collimate the laser beam received from the emitting reflective surface. The fourth lens 8 is disposed on a receiving path of the receiving reflective surface, and configured to focus the received laser beam and send the laser beam to the receiving reflective surface.

In this solution of this embodiment of the present disclosure, the two surfaces of the scanning mirror 2 of the laser radar are the reflective surfaces, in other words, the scanning mirror 2 has the receiving reflective surface and the emitting reflective surface. This is different from the technical solution in the related technology. The emitted laser beam and the reflected laser beam are located on the two sides of the scanning mirror 2 respectively, to implement complete separation. This avoids the crosstalk between the two laser beams, and lowers the assembling and commissioning requirement.

Based on setting of the emitting reflective surface and the receiving reflective surface of the scanning mirror, it can be learned based on a geometrical relationship that the second included angle between the laser beam incident onto the emitting reflective surface of the scanning mirror 2 and the laser beam reflected by the receiving reflective surface, and the first included angle between the first reflector and the second reflector satisfy the specific relationship. Therefore, when the first reflector and the second reflector are fixed, and the angle of the laser beam incident onto the emitting reflective surface of the scanning mirror 2 is unchanged, the angle of the laser beam reflected by the receiving reflective surface also keeps unchanged, and does not change with the rotation of the scanning mirror 2. The laser radar provided in this embodiment of the present disclosure implements synchronous scanning and receiving.

In addition, effective laser beam emitting area and effective laser beam receiving area are increased. This helps achieve a low divergence angle of an emitted beam, increase signal strength of a received beam, and improve a detection distance and detection efficiency.

The foregoing descriptions are merely example embodiments of the present disclosure, but are not intended to limit this application. Any modification, equivalent replacement, or improvement made without departing from the principle of this application should be understood to fall within the protection scope of this application.

What is claimed is:

1. A laser radar, comprising:
   a detector;
   a light source configured to emit an incident laser beam;
   a scanning mirror comprising:
   an emitting reflective surface configured to reflect the incident laser beam towards an object in order to scan the object; and
   a receiving reflective surface configured to reflect an emergent laser beam towards the detector, wherein the emergent laser beam is based on reflection of the incident laser beam on the object; and
a reflector group comprising:
a first reflector; and
a second reflector,
wherein the first reflector and the second reflector are perpendicular to a same plane,
wherein the first reflector and the second reflector are configured to change a propagation direction of the incident laser beam after reflection of the incident laser beam on the object, and
wherein a second included angle between the incident laser beam and the emergent laser beam is twice a first included angle between the first reflector and the second reflector.

2. The laser radar according to claim 1, wherein the first reflector is configured to reflect, to the second reflector, the incident laser beam as a first reflected beam after reflection of the incident laser beam on the object, and wherein the second reflector is configured to reflect, to the receiving reflective surface, the first reflected laser beam as a second reflected laser beam.

3. The laser radar according to claim 2, wherein the reflector group further comprises a fifth reflector, wherein the fifth reflector is perpendicular to the first reflector and the second reflector, and wherein the fifth reflector is configured to reflect the incident laser beam to emit a third reflected laser beam.

4. The laser radar according to claim 2, wherein the reflector group further comprises a third reflector and a fourth reflector, wherein an included angle between the third reflector and the fourth reflector is equal to the first included angle, wherein the first reflector, the second reflector, the third reflector, and the fourth reflector are perpendicular to the same plane, wherein the third reflector is configured to reflect, to the fourth reflector, the incident laser beam as a third reflected laser beam, and wherein the fourth reflector is configured to reflect, to the receiving reflective surface, the third reflected laser beam reflected.

5. The laser radar according to claim 1, wherein the first reflector is configured to reflect, to the second reflector, the incident laser beam as a first reflected laser beam, and wherein the second reflector is configured to reflect the first reflected laser beam to emit a second reflected laser beam.

6. The laser radar according to claim 5, wherein the reflector group further comprises a fifth reflector, wherein the fifth reflector is perpendicular to the first reflector and the second reflector, and wherein the fifth reflector is configured to reflect, to the receiving reflective surface, the incident laser beam as a third reflected laser beam.

7. The laser radar according to claim 1, wherein the first reflector is configured to reflect the incident laser beam reflected to emit a first reflected laser beam, and wherein the second reflector is configured to reflect, to the receiving reflective surface, a second laser beam reflected back by the object.

8. The laser radar according to claim 7, wherein the reflector group further comprises a fifth reflector, wherein the fifth reflector is perpendicular to the first reflector and the second reflector, wherein the fifth reflector is configured to reflect, to the second reflector, the incident laser beam as a third reflected laser beam, and wherein the second reflector is configured to reflect, to the receiving reflective surface, the third reflected laser beam.

9. The laser radar according to claim 1, wherein the first included angle between the first reflector and the second reflector is 90°.

10. The laser radar according to claim 1, wherein the reflector group further comprises a sixth reflector, a seventh reflector, and an eighth reflector, wherein an included angle between the sixth reflector and the seventh reflector is equal to the first included angle, wherein the first reflector and the second reflector are perpendicular to a first plane, wherein the sixth reflector and the seventh reflector are perpendicular to a second plane, wherein the second plane is perpendicular to the first plane, and wherein the eighth reflector is perpendicular to the first plane and the second plane.

11. The laser radar according to claim 10, wherein the eighth reflector is configured to reflect, to the sixth reflector, the incident laser beam as a first reflected laser beam, wherein the sixth reflector is configured to reflect, to the seventh reflector, the first reflected laser beam as a second reflected laser beam, wherein the seventh reflector is configured to reflect, to the first reflector, the second reflected laser beam as a third reflected laser beam, wherein the first reflector is configured to reflect, to the second reflector, the third reflected laser beam as a fourth reflected laser beam, and wherein the second reflector is configured to reflect, to the receiving reflective surface, the fourth reflected laser beam.

12. The laser radar according to claim 10, wherein the sixth reflector is configured to reflect, to the seventh reflector, the incident reflected laser beam as a first reflected laser beam, wherein the seventh reflector is configured to reflect the first laser beam to emit the reflected laser beam, wherein the eighth reflector is configured to reflect, to the first reflector, the incident laser beam as a second reflected laser beam, wherein the first reflector is configured to reflect, to the second reflector, the second reflected laser beam as a third reflected laser beam, and wherein the second reflector is configured to reflect, to the receiving reflective surface, the third reflected laser beam.

13. The laser radar according to claim 10, wherein the sixth reflector is configured to reflect, to the seventh reflector, the incident laser beam as a first reflected laser beam, wherein the seventh reflector is configured to reflect, to the eighth reflector, the first reflected laser beam as a second reflected laser beam, wherein the eighth reflector is configured to reflect the second reflected laser beam to emit the second reflected laser beam, wherein the first reflector is configured to reflect, to the second reflector, the incident laser beam as a third reflected laser beam, and wherein the second reflector is configured to reflect, to the receiving reflective surface, the third reflected laser beam.

14. The laser radar according to claim 1, further comprising a first lens and a second lens, wherein the first lens is disposed on an emission path of the light source and is configured to collimate or focus the incident laser beam received from the light source, and wherein the second lens is disposed on a receiving path of the detector and is configured to focus and send the incident laser beam to the detector.

15. A laser radar, comprising:
a light source configured to emit a first incident laser beam;
a scanning mirror comprising:
an emitting reflective surface configured to reflect the first incident laser beam as a first reflected laser beam for scanning an object; and
a receiving reflective surface configured to reflect a laser beam reflected back by the object, wherein a third included angle is between the emitting reflective surface and the receiving reflective surface;

a detector configured to receive the laser beam reflected by the object; and a reflector group comprising a first reflector and a second reflector that are configured to change a propagation direction of the first incident laser beam, wherein the first reflector and the second reflector are perpendicular to a same plane, wherein a first included angle is between the first reflector and the second reflector, and wherein a second included angle is between a second incident laser beam of the emitting reflective surface and an emergent laser beam of the receiving reflective surface, wherein the second included angle is twice a sum of the first included angle and the third included angle when an included angle between a second laser beam incident onto the receiving reflective surface and the receiving reflective surface is greater than an included angle between the second laser beam incident onto the receiving reflective surface and the emitting reflective surface, or wherein the second included angle is twice a difference between the first included angle and the third included angle when an included angle between a third laser beam incident onto the receiving reflective surface and the receiving reflective surface is less than an included angle between the third laser beam incident onto the receiving reflective surface and the emitting reflective surface.

16. The laser radar according to claim 15, wherein the first reflector is configured to reflect, to the second reflector, the laser beam as a second reflected laser beam, and wherein the second reflector is configured to reflect, to the receiving reflective surface, the second reflected laser beam.

17. The laser radar according to claim 16, wherein the reflector group further comprises a fifth reflector perpendicular to the first reflector and the second reflector, and wherein the fifth reflector is configured to reflect the first reflected laser beam to emit the first reflected laser beam.

18. The laser radar according to claim 15, wherein the reflector group further comprises a sixth reflector, a seventh reflector, and an eighth reflector, wherein an included angle between the sixth reflector and the seventh reflector is equal to the first included angle, wherein the first reflector and the second reflector are perpendicular to a first plane, wherein the sixth reflector and the seventh reflector are perpendicular to a second plane, wherein the second plane is perpendicular to the first plane, and wherein the eighth reflector is perpendicular to the first plane and the second plane.

19. The laser radar according to claim 18, wherein the eighth reflector is configured to reflect, to the sixth reflector, the laser beam as a second reflected laser beam, wherein the sixth reflector is configured to reflect, to the seventh reflector, the second reflected laser beam as a third reflected laser beam, wherein the seventh reflector is configured to reflect, to the first reflector, the third reflected laser beam as a fourth reflected laser beam, wherein the first reflector is configured to reflect, to the second reflector, the fourth reflected laser beam as a fifth reflected laser beam, and wherein the second reflector is configured to reflect, to the receiving reflective surface, the fifth reflected laser beam.

20. The laser radar according to claim 15, further comprising a first lens and a second lens, wherein the first lens is disposed on an emission path of the light source and is configured to collimate or focus the first incident laser beam received from the light source, and wherein the second lens is disposed on a receiving path of the detector and is configured to focus and send the first incident laser beam to the detector.

21. A ladar comprising:
a detector;
a light source configured to emit an incident laser beam;
a scanning mirror comprising:
an emitting reflective surface configured to reflect the incident laser beam as a first reflected beam and towards an object in order to scan the object; and
a receiving reflective surface configured to reflect a fourth reflected beam as a fifth reflected beam and towards the detector; and
a reflector group comprising:
a first reflector configured to redirect and reflect a second reflected beam as a third reflected beam, wherein the second reflected beam is based on a reflection of the first reflected beam on the object; and
a second reflector configured to redirect and reflect the third reflected beam as the fourth reflected beam,
wherein the first reflector and the second reflector are perpendicular to a same plane, and
wherein a second included angle between the incident laser beam and the fifth reflected beam is twice a first included angle between the first reflector and the second reflector.

* * * * *